United States Patent [19]
Saito et al.

[11] Patent Number: 5,847,906
[45] Date of Patent: Dec. 8, 1998

[54] RECORDING/REPRODUCING APPARATUS, MAGNETIC HEAD AND TAPE CARTRIDGE

[75] Inventors: Kengo Saito; Ikushi Nakashima; Osamu Koizumi; Masanori Sato; Shinji Masugi; Noriko Nakazawa, all of Miyagi, Japan

[73] Assignee: Sony Corporation, Japan

[21] Appl. No.: 857,918

[22] Filed: May 16, 1997

Related U.S. Application Data

[62] Division of Ser. No. 717,328, Sep. 20, 1996.

[30] Foreign Application Priority Data

Sep. 29, 1995 [JP] Japan ................................. 7-276885

[51] Int. Cl.$^6$ .................................................. G11B 15/62
[52] U.S. Cl. ...................................................... 360/130.21
[58] Field of Search .............................. 360/132, 130.21; 226/196

[56] References Cited

FOREIGN PATENT DOCUMENTS 2250128  5/1992  United Kingdom .

Primary Examiner—Robert S. Tupper
Attorney, Agent, or Firm—Ronald P. Kananen

[57] ABSTRACT

A recording/reproducing apparatus in which recording/reproducing characteristics for the magnetic tape may be stabilized and data errors may be reliably prevented form occurrence. The recording/reproducing apparatus has a magnetic head 81 in which a pair of magnetic core halves 83A, 83B of a magnetic material are abutted to each other via a gap material g to form a magnetic core. Magnetic tape guide units 82A, 82B are provided in the vicinity of the magnetic head 81. The magnetic tape guide units 82A, 82B are formed with magnetic tape suction openings 82b, 82b closed by a magnetic tape 88 adapted for having a sliding contact with the tape slide surface 82a. The magnetic tape suction openings 82b, 82b suck the magnetic tape 88 running on the tape slide surfaces 82a, 82a of the magnetic tape guide units 82A, 82B.

5 Claims, 38 Drawing Sheets

FRONT VIEW OF SIDE MAGNETIC HEAD

| RECORDING/REPRODUCING APPARATUS OF SECOND EMBODIMENT | CONVENTIONAL RECORDING/REPRODUCING APPARATUS |
|---|---|
|  |  |

US 5,847,906

RECORDING/REPRODUCING APPARATUS, MAGNETIC HEAD AND TAPE CARTRIDGE

This application is a division of application Ser. No. 08/717,328 filed Sep. 20, 1996 pending.

BACKGROUND OF THE INVENTION

1. Field of the Invention

This invention relates to a magnetic head for impressing a magnetic field across a magnetic tape by being contacted with a running magnetic tape, a tape cartridge used for data backup for a personal computer, an office computer or the like, and a recording/reproducing apparatus carrying the magnetic head and having the tape cartridge loaded thereon.

2. Description of the Related Art

The recording/reproducing apparatus is connected to a personal computer, an office computer or the like and used with a data cartridge loaded thereon. With the data cartridge, data signals accumulated in, for example, a memory of a main portion of a computer are sucked and recorded by a magnetic head on a recording medium, such as a magnetic tape, magnetic disc or a magneto-optical disc. Alternatively, data signals recorded on the recording medium are reproduced by a magnetic head and supplied to, for example, a memory of the main portion of the computer.

In a data cartridge having a magnetic tape as a recording medium, for example, a main body portion of the cartridge is formed by combining a cover substantially in the shape of a shallow saucer and a base paste 201 substantially in the shape of rectangular plate to form a main body portion of the cartridge. Within the interior of the cartridge main body portion are mounted a pair of reel pins 202, tape guide pins 203 and guide roll pins 204. On the reel pins 202 are rotatably mounted a tape supply reel and a tape take-up reel carrying a coil of a magnetic tape 205. A magnetic tape 205 is placed around the reel pins 202. The guide roll pins 204 carry a driving mechanism having an endless belt adapted for rotationally driving the tape supply reel and the tape take-up reel.

A magnetic head 206, provided on the recording/reproducing apparatus, has a pair of magnetic core halves 207, 208 abutted and connected to each other with a back gap g2 as a boundary, as shown in FIG. 2. The magnetic core halves 207, 208 are provided with track width control grooves 209, 210 for adjusting the track width of the front gap g1. Within each of the track width control grooves 209, 210 is charged the fused glass 211 for bonding the core halves together.

The magnetic head 206 has a coil-winding slot 212 towards abutment surfaces 207a, 207a of the magnetic core halves 207, 208 in order to permit winding of a coil, not shown. The magnetic head 206 has winding guide slots 213, 214 for assisting the coil winding on opposite lateral surfaces 207c, 208c of the winding slot 212 of the magnetic core halves 207, 208.

When the above-described data cartridge is loaded on the recording/reproducing apparatus, a magnetic head 206 provided on the side of the recording/reproducing apparatus is thrust a pre-set amount for recording or reading data signals with respect to the magnetic tape 205, as shown in FIG. 3. At this time, as the magnetic tape 205 is thrust by the magnetic head 206 provided on the side of the recording/reproducing apparatus, the magnetic tape 205 in the data cartridge is subjected to tape tension which is a resistive force the magnetic tape 205 exerts against the magnetic head 206. As the take-up ratio by the tape take-up reel is increased, the magnetic tape 205 is subjected to tape tension which is increased gradually with increase in the take-up ratio by the tape take-up reel, as shown in FIG. 4.

If the magnetic tape 205 is subjected to increased tape tension and vibrations in the tensioning direction are small, the magnetic tape 205 has good contact with the magnetic head 206 of the recording/reproducing apparatus, thus assuring stable recording/reproduction.

However, if the magnetic tape 205 is subjected to vibrations in the running direction as indicated by arrow X in FIG. 5, the playback position of the magnetic head 206 with respect to the magnetic tape 205 is instantaneously moved such that the magnetic head cannot recognize data signals to produce data errors.

Moreover, if the magnetic tape 205 is subjected to off-track as a result of transverse vibrations as indicated by arrow Y in FIG. 5, there is produced deviation in the reproducing position or recording position of the magnetic head 206 when reproducing or recording a track recorded on the magnetic tape 205 by the magnetic head 206 thus giving effect to data errors.

In addition, in a data cartridge, since the tape tension is changed with the tape take-up ratio, the contact pressure between the magnetic tape 205 and the magnetic head 206 on the side of the recording/reproducing apparatus is changed when the tape tension is decreased or the vibrations in the tensioning direction as indicated by arrow Z in FIG. 5 are increased, thus varying the contact pressure between the magnetic tape 205 and the magnetic head 206 on the recording/reproducing apparatus, thus again giving rise to data errors.

In order to provide a data cartridge freed of these causes of data errors, it may be contemplated to control the vibrations in the direction of tension and width and in the tape running direction of the magnetic tape 205 at a position between the root portion and an anti-extraction flange provided around the rim of the upper edge of the tape guide pin 203 while the magnetic tape 205 runs between the two tape guide pins 203.

However, with this data cartridge, the distance from the root of the tape guide pin 203 to the flange needs to be kept equal to the width of the magnetic tape 205, such that the edge of the magnetic tape 205 is worn out due to contact with the major surface portion of the base plate 201 or the flange, thus destructing the magnetic tape 205.

The fact that the running magnetic tape 205 undergoes vibrations is a serious problem in the case of a data cartridge in which the future tendency is towards a smaller track width of the magnetic tape 205, higher recording density and a thinner thickness.

SUMMARY OF THE INVENTION

It is therefore an object of the present invention to provide a tape cartridge, magnetic head and a recording/reproducing apparatus whereby recording/reproducing characteristics for the magnetic tape may be stabilized and data error generation may be positively prohibited from occurrence.

The present invention provides a recording/reproducing apparatus including a magnetic head formed by a pair of magnetic core halves of a magnetic material abutted to each other with a gap material in-between. Magnetic tape guide means are provided in the vicinity of the magnetic head. A magnetic tape suction opening closed by the magnetic tape is provided in the magnetic tape guide means. The magnetic tape is adapted for having a sliding contact with a magnetic tape slide surface of the magnetic tape guide means. The magnetic tape suction opening sucks the magnetic tape running on the magnetic tape slide surface of the magnetic tape guide means.

The amount of thrusting of the magnetic head against the magnetic tape may be not more than 5.0 mm. If such amount is in a range from 0.0 mm to 5.0 mm, the magnetic tape is allowed to run in higher stability than is possible with the conventional magnetic head if the amount is in a range from 0.0 mm to 5.0 mm.

The amount of thrusting of the tape guide means against the magnetic tape may be not more than −0.1 mm or not less than 5.0 mm. In particular, if such amount is in a range from −0.1 mm to 5.0 mm, the magnetic tape is allowed to run without vibrations in higher stability than is possible with the conventional magnetic head.

The present invention also provides a magnetic head including a magnetic core formed by a pair of magnetic core halves of a magnetic material abutted to each other with a gap material in-between. The magnetic core has a magnetic tape suction opening closed by the magnetic tape adapted for having a sliding contact with a tape contact surface of the magnetic core. The magnetic core suction opening sucks the magnetic tape running on the tape contact surface of the magnetic core.

The present invention also provides a tape cartridge including a main cartridge portion, a pair of tape reels rotatably arranged in the inside of the main cartridge portion and a magnetic tape placed around the tape reels. The cartridge main portion has magnetic tape guide means. The magnetic tape guide means has a magnetic tape suction opening closed by the magnetic tape adapted for having a sliding contact with a tape slide surface of the magnetic tape guide means. The magnetic tape suction opening sucks the magnetic tape running on the tape slide surface of the tape guide means.

The thrust amount of the magnetic tape by the magnetic head may be not less than 5.0 mm. In particular, if such amount is in a range from 0.0 mm to 5.0 mm, the magnetic tape is allowed to run in higher stability than is possible with the conventional tape cartridge.

The amount of thrusting of the tape guide means against the magnetic tape may be not more than −0.1 mm or not less than 5.0 mm. In particular, if such amount is in a range from −0.1 mm to 5.0 mm, the magnetic tape is allowed to run without vibrations in higher stability than is possible with the conventional tape cartridge.

With the recording/reproducing apparatus according to the present invention, since magnetic tape guide means provided with a tape suction opening closed by a magnetic tape is arranged in the vicinity of the magnetic head, the magnetic tape running along magnetic tape guide means is sucked by the tape suction opening for controlling vibrations of the magnetic tape in the direction of tension and width of the tape and in the tape running direction for improving the running performance of the magnetic tape. Also the recording/reproducing characteristics for the magnetic tape may be stabilized and data errors may be prevented positively from occurrence.

With the recording/reproducing apparatus, the recording/reproducing characteristics may be stabilized for the entire recording tracks of the magnetic tape irrespective of the magnetic head position relative to the recording track of the magnetic tape for positively preventing data errors from occurrence.

Thus it is possible for the recording/reproducing apparatus to run the magnetic tape in stable condition and to use a higher recording frequency for the magnetic tape for increasing the number of recording tracks and hence the recording capacity of the magnetic tape.

With the magnetic head according to the present invention, since a magnetic tape suction opening closed by the magnetic tape is provided in the magnetic core surface, the magnetic tape running along magnetic tape guide means is sucked by the tape suction opening for controlling vibrations of the magnetic tape in the direction of tension and width of the tape and in the tape running direction, thereby improving the running performance of the magnetic tape. Moreover, the recording/reproducing characteristics for the magnetic tape may be stabilized and data errors may be prevented positively from occurrence.

With the magnetic head according to the present invention, the recording/reproducing characteristics may be stabilized for the entire recording tracks of the magnetic tape irrespective of the magnetic head position relative to the recording track of the magnetic tape for positively preventing data errors from occurrence.

Thus it is possible for the magnetic head to run the magnetic tape in stable condition and to use a higher recording frequency for the magnetic tape for increasing the number of recording tracks and hence the recording capacity of the magnetic tape.

With the data cartridge according to the present invention, since magnetic tape guide means provided with a magnetic tape suction opening closed by the magnetic tape is provided in the cartridge main portion, the magnetic tape running along magnetic tape guide means is sucked by the tape suction opening for controlling vibrations of the magnetic tape in the direction of tension and width of the tape and in the tape running direction, thereby improving the running performance of the magnetic tape. Moreover, the recording/reproducing characteristics for the magnetic tape may be stabilized and data errors may be prevented positively from occurrence.

Thus it is possible for the data cartridge to run the magnetic tape in stable condition and to use a higher recording frequency for the magnetic tape, thereby increasing the number of recording tracks and hence the recording capacity of the magnetic tape.

DESCRIPTION OF THE PREFERRED EMBODIMENTS

Figure 6:
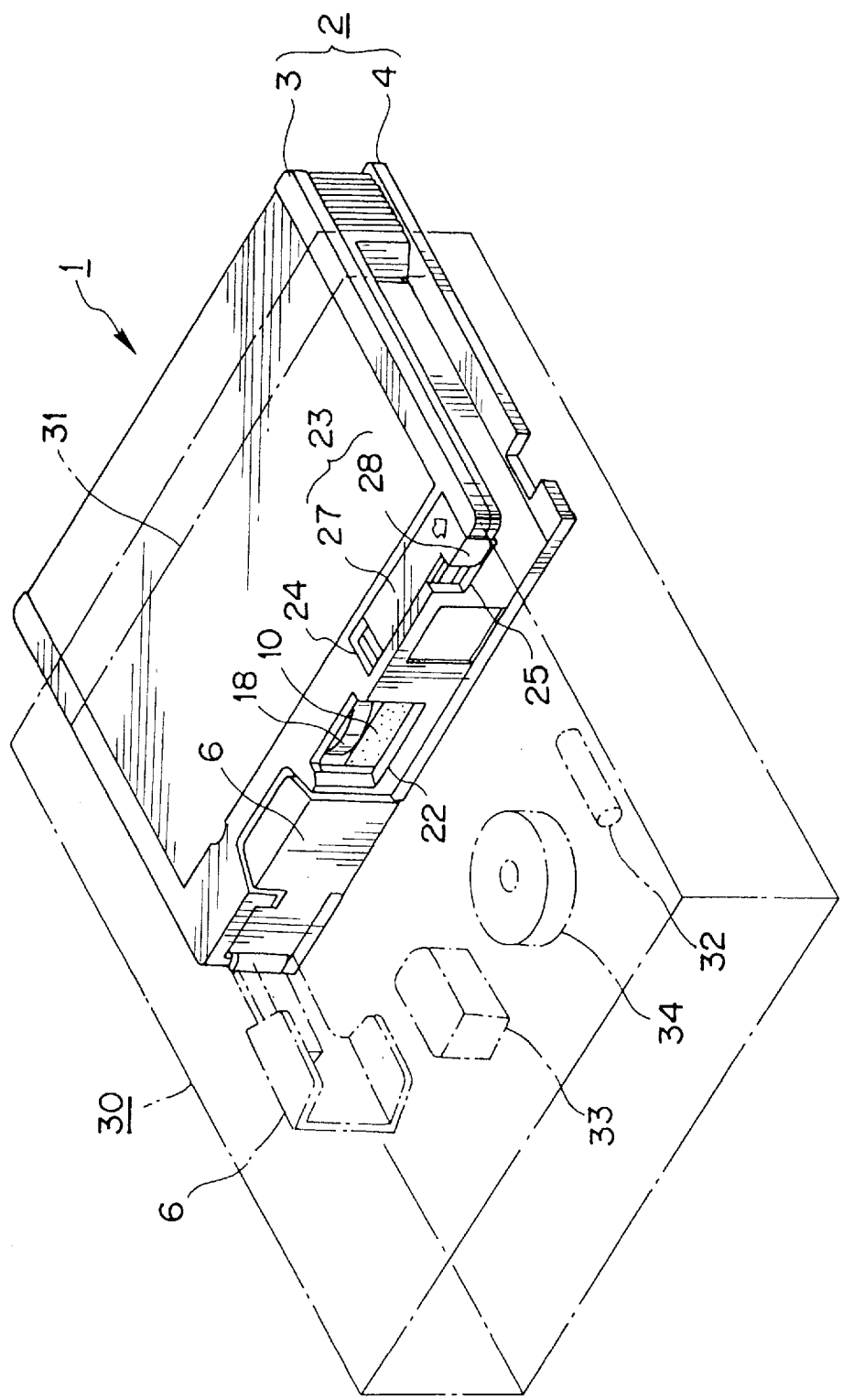
FIG. 6 is a perspective view showing a data cartridge according to a first embodiment according to the resent invention.

Referring to FIGS. 6 to 27, preferred embodiments of a tape cartridge according to the present invention will be explained in detail. A tape cartridge 1 of the first embodiment is loaded on a recording/reproducing apparatus 30 connected to, for example, a computer device, for sucking or feeding back data signals accumulated in a memory provided in the main body portion, as shown in FIG. 6.

The recording/reproducing apparatus, in which the data cartridge 1 is loaded, has, in a cartridge inserting opening 31, a mistaken recording detection member 32 constituting the mistaken recording inhibiting mechanism, a magnetic head 33 for recording or reading out data signals on a magnetic tape 7, and a driving roll 34 for driving a tape driving mechanism. The recording/reproducing apparatus 30 is well-known per se and hence the remaining portions are not explained for clarity.

Figure 7:
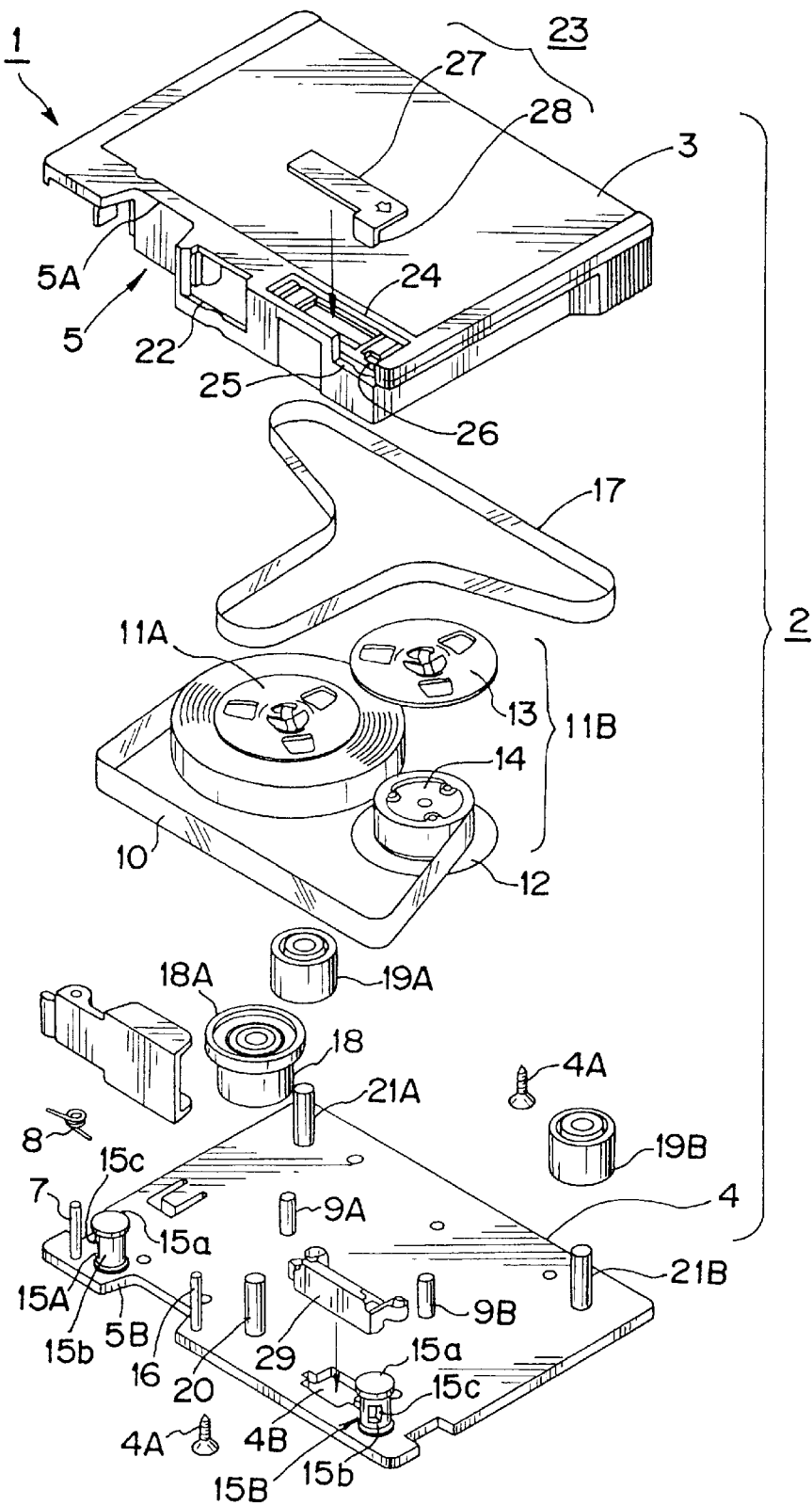
FIG. 7 is an exploded perspective view showing the data cartridge.

The data cartridge 1 is formed into a cartridge main portion 2 by integrally combining a cover 3 of a synthetic resin material, such as polycarbonate rein, substantially in the shape of a shallow square-shaped saucer, and a base plate 4 by a set screw 4A or a mounting stud, not shown, formed on the inner surface of the cover 3, as shown in FIG. 7. The base plate 4 is formed of a metal plate, such as an aluminum or aluminum alloy plate, combined on an opened lower portion of the cover 3.

The front side of the cartridge main portion 2 has a recording/reproducing aperture 5 defined by cut-outs 5A, 5B in the forward edges of the cover plate 3 and the base plate 4. The recording/reproducing aperture 5 is sized to permit entrance of the magnetic head 33 of the recording/ reproducing apparatus 30 in which the data cartridge 1 is loaded, and is usually closed by a lid member 6 constituting a portion of the front surface of the cartridge main portion 2. The lid member 6 is rotatably supported in a cantilevered fashion by a lid pin 7 set upright on the forward corner of the base plate 4 by being biased by a torsion spring 8 in a direction of closing the recording/reproducing aperture 5.

In a mid portion of the base plate 4 are set a pair of reel pins 9A, 9B upright at a distance from each other. These reel pins 9A, 9B rotatably support a tape supply reel 11A and a tape take-up reel 11B, respectively. A magnetic tape 10¼ inch wide is placed around the reel pins 9A, 9B.

The tape supply reel 11A and the tape take-up reel 11B are constituted respectively by a lower reel member 12 integrally formed with a reel hub 14 and a lower reel member 13 combined with the lower reel member 12. The beginning and terminal ends of the magnetic tape 10 are secured to the reel hub 14 by a clamper, not shown.

On the front side of the base plate 4 are set upright columnar-shaped flanged guide pins 15A, 15B and a tape guide pin 16, as shown in FIG. 7. The magnetic tape 10 reeled out from the tape supply reel 11A is placed around these flanged guide pins 15A, 15b and the tape guide pin 16.

Figure 8:
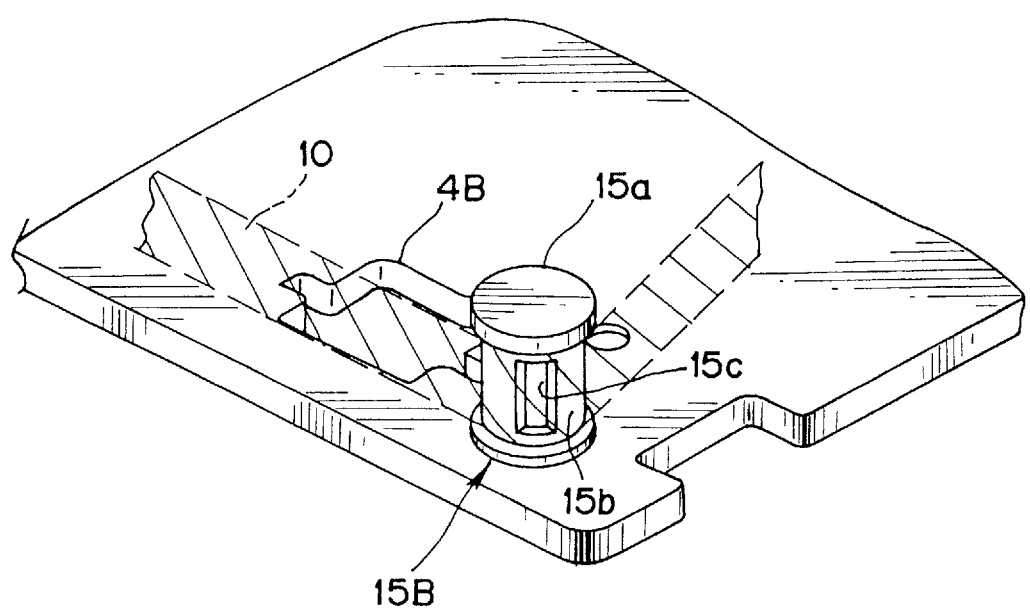
FIG. 8 is a perspective view showing a flanged guide pin of the data cartridge.

The flanged guide pins 15A, 15B are formed with flanges 15a, 15b around the upper edges thereof for preventing detachment of the magnetic tape 10, as shown in FIG. 8. Thus, when running between the flanged guide pins 15A, 15B, the magnetic tape 10 runs along the front side of the cartridge main portion 2 at a constant height under control by the flanges 15a, 15b and the root portions of the flanged guide pins 15A, 15B.

The tape sliding surfaces 15a, 15b of the flanged guide pins 15A, 15B are of surface roughness in terms of the maximum height from a centerline corresponding to the equal areas of the recesses and protrusions in the cross-sectional surface of not less than 0.8 $\mu$m in order to prevent the magnetic tape 10 from being stuck to the guide pins.

The tape sliding surfaces 15a, 15b are formed with magnetic tape suction grooves 15c, 15c having a height larger than the width of the magnetic tape 10 and a width smaller than the length of the magnetic tape 10 lying within a range thereof contacted by the tape sliding surfaces 15b, 15b. By way of an example, the magnetic tape suction grooves 15c, 15c are of a height of 4.0 mm, a width of 2.0 mm and a depth of 2.0 mm.

The tape supply reel 11A and the tape take-up reel 11B are run in rotation by a tape driving mechanism for running the magnetic tape 10, as shown in FIG. 7. The tape driving mechanism is made up of an endless belt 17, a belt driving roll 18 around which the endless belt 17 is run and a pair of belt guide rolls 19A, 19B.

The belt driving roll 18 is formed of a wear-resistant elastic material and has on its upper edge portion a driving flange 18A adapted for having a rolling contact with the driving roll 34 provided on the recording/reproducing apparatus. The belt driving roll 18 is rotatably mounted on a driving roll pin 20 set upright on a mid portion of the forward side portion of the base plate 4.

The belt guide rolls 19A, 19B are formed by a wear-resistant elastic material and are rotatably mounted on a pair of guide roll pins 21A, 21B set upright on both rear corners of the base plate 4.

The endless belt 17 is placed around the belt guide rolls 19A, 19B and around the belt driving roll 18 via a mid portion of the tape supply reel 11A and the tape take-up reel 11B. Thus the endless belt 17 is adapted for contacting with the magnetic tape 10, placed around the tape supply reel 11A and the tape take-up reel 11B, for affording a pre-set tension thereto, and travels along a substantially convex-shaped running path.

The cover 3 has on its front side a rectangular-shaped driving aperture 22 for exposing a portion of the peripheral surface of the belt driving roll 18 to outside. When the data cartridge 1 is loaded in position on the recording/reproducing apparatus 30, the driving roll 34 of the recording/reproducing apparatus 30 is intruded via the driving aperture 22 into rolling contact with the driving flange 18A formed on the peripheral surface of the belt driving roll 18 for driving the tape driving mechanism.

The cover 3 has on its upper front portion a mistaken recording inhibiting portion for cooperating with the mistaken recording inhibiting member 23 for preventing inadvertent erasure of the data signals recorded on the magnetic tape 10.

The mistaken recording inhibiting portion has an operating guide opening 24, formed as a substantially rectangular opening extending along the front surface of the cover 3, a slide guide groove 25, formed as a substantially rectangular groove on the front surface of the cover 3, and a substantially rectangular mistaken recording detection opening 26 in the vicinity of the slide grove 25 within the interior of the operating guide opening 24.

The mistaken recording inhibiting member 23 is formed of a synthetic resin material and is made up of a substantially rectangular operating member 27 and a closure plate 28 formed integral with and extending at right angles to the operating member 27. The mistaken recording inhibiting member 23 is assembled slidably so that the operating member 27 is positioned on the guide opening 24 and the closure plate 28 is positioned in the side groove 25. The operating member 27 is of a length such that it can be slid between a first position of opening the mistaken recording detection opening 26 and a second position of closing the detection opening 26. The closure late 28 is of an outer shape and size sufficient to cover the detection opening 26 when the operating portion 27 is slid to the second position.

The base plate 4 is formed with a reflecting member mounting opening 4B on its front side close to the flanged guide pin 15B. In this mounting opening 4B is mounted a reflecting member 29 formed as a substantially triangular block member. On an oblique side of the reflecting member 29 facing the running path of the magnetic tape 10 is formed a mirror. Thus, when the data cartridge 1 is mounted on the recording/reproducing apparatus 30, an image of a beginning end detection opening or a terminal end detection opening formed respectively at the beginning or terminal portions of the magnetic tape 10 is formed on the mirror of the reflecting member 29 so that the beginning end or the terminal end of the magnetic tape 10 can be detected by detection means provided on the recording/reproducing apparatus 30.

The data cartridge 1, designed and constructed as described above, has its mistaken recording detection opening 26 closed by the mistaken recording inhibiting member 23 being moved from the first position to the second position along the operating guide opening 24, as shown in FIG. 6. When the data cartridge 1 is loaded within the inside of the cartridge inserting aperture 31 of the recording/reproducing apparatus 30, with the mistaken recording inhibiting member 23 closing the mistaken recording detection opening 26, the mistaken recording detection member 32 is prohibited from entering the cartridge insertion aperture 31 to permit recording of data signals on the magnetic tape 10 by the magnetic head 33.

The lid member 6 of the data cartridge 1 is turned about the pin 7 for the lid member as the center of rotation by lid member opening means, not shown, provided on the recording/reproducing apparatus, against the resiliency of the torsion spring 8, for opening the recording/reproducing aperture 5. Into the data cartridge 1 is intruded the magnetic head 33 of the recording/reproducing apparatus 30 via the opened aperture 5 into contact with the magnetic tape 10. On the other hand, the driving roll 34 provided on the recording/reproducing apparatus 30 is intruded into the data cartridge 1 via the driving aperture 22 into contact with the driving flange 18A of the belt driving roll 18 with the magnetic tape 10 and the endless belt 17 in-between.

Figure 9:
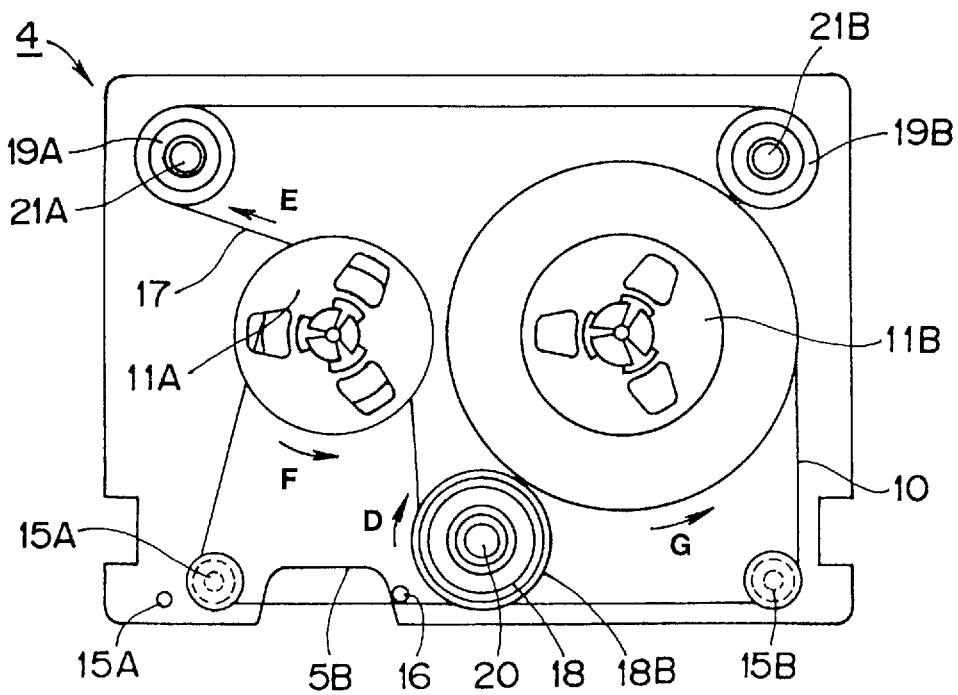
FIG. 9 is a schematic plan view for illustrating the running state of the magnetic tape of the data cartridge.

When the driving roll 34 provided on the recording/reproducing apparatus 30 is turned counterclockwise, the belt driving roll 18 is turned clockwise as indicated by arrow D in FIG. 9. By rotation of the belt driving roll 18, the endless belt 17 in its entirety is turned clockwise in a direction as indicated by arrow E in FIG. 9.

By rotation of the endless belt 17, the tape supply reel 11A of the data cartridge 1 is rotated counterclockwise as indicated by arrow F in FIG. 9 for reeling out the magnetic tape 10. The magnetic tape is run along the front side of the cartridge main portion 2 so as to be taken up on the tape take-up reel 11B which is rotated counterclockwise as indicated by arrow G in FIG. 9.

Figure 10:
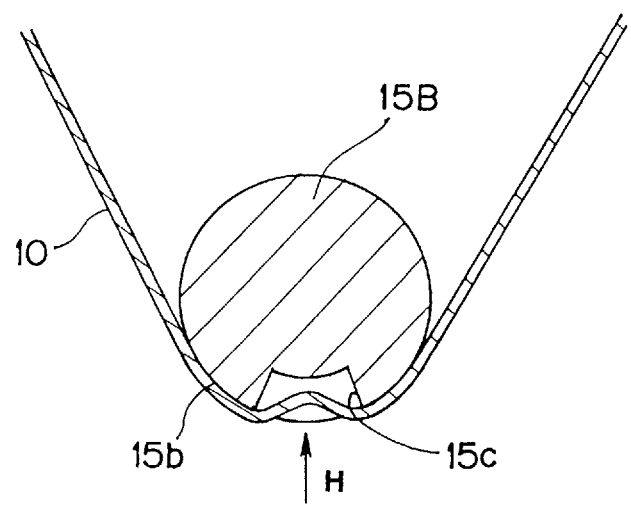
FIG. 10 is a schematic horizontal cross-sectional view showing the state of running of a magnetic tape around the flanged guide pin.

When the magnetic tape 10 is run, there is generated a differential atmospheric pressure between the inside and the outside of the tape suction grooves 15c, 15c of the flanged guide pin, via the magnetic tape 10, as shown in FIG. 10. Thus the magnetic tape 10 is sucked in a direction indicated by arrow H in FIG. 10, so that the magnetic tape 10 is run in contact with the tape sliding surfaces 15b, 15b of the flanged guide pin. At this time, an air film layer is produced in the data cartridge 14 between the tape sliding surfaces 15b, 15b of the flanged guide pin and the running magnetic tape 10 for preventing the friction between the tape and the tape slide surfaces.

With the data cartridge 1, the magnetic tape 1 is damped in its vibrations in the directions of tape tension and width and in the tape running direction, under the force of suction exerted by the tape suction grooves 15c, 15c of the flanged guide pin on the magnetic tape, for allowing the magnetic tape 10 to run in a stable state. It has been confirmed experimentally that the vibrations of the magnetic tape 10 of the data cartridge 1 can be reduced to about one-third as compared to the conventional data cartridge in terms of the output voltage ratio as measured by an optical displacement meter.

Thus the data cartridge 1 runs along the front side of the cartridge main portion 2 under the constant tape tension of the running magnetic tape 10 with resect to the magnetic head 33 to permit data signals to be recorded or read out on the magnetic tape 10 by the magnetic head 33 positively contacted with the magnetic tape 10.

With the data cartridge 1, the magnetic head 33 is moved along its width in one or the other direction depending on the running direction of the magnetic tape 10 driven bi-directionally between the tape supply reel 11A and the tape take-up reel 11B, so that an upper recording track portion and a lower recording track portion on the magnetic tape 10 are selectively scanned for recording or reading the data signals.

In the above-described data cartridge 1 of the first embodiment, in which the magnetic tape suction grooves 15c, 15c are formed in the flanged guide pins 15A, 15B, the running magnetic tape 10 is sucked by these suction grooves 15c, 15c for controlling the vibrations of the magnetic tape 10 in the directions of tape tension and width and in the tape running direction for improving running properties of the magnetic tape 10. In addition, recording/reproducing characteristics for the magnetic tape 10 may be stabilized for reliably prohibiting data errors.

Thus the magnetic tape 10 can be run in stabilized state and the recording frequency can be set to a higher value, while the number of the recording tracks on the magnetic tape 10 can be increased for increasing the recording capacity.

A data cartridge 40 of the second embodiment is similar in basic structure to the data cartridge 1 of the first embodiment. In the following description, the parts or components which are the same as those of the data cartridge 1 of the previous first embodiment are demoted by the dame reference numerals and the description thereof is omitted for simplicity.

Figure 11:
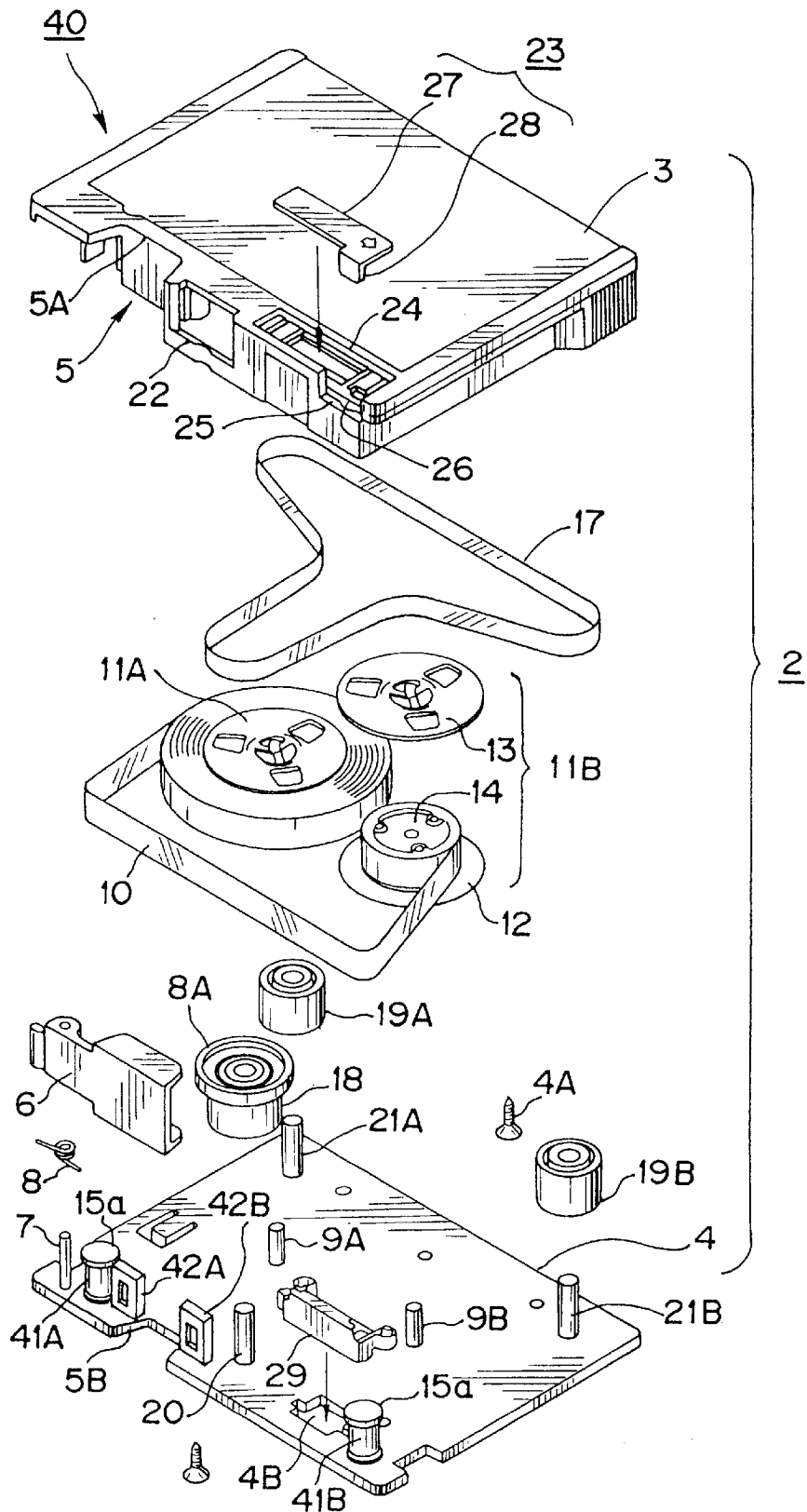
FIG. 11 is a perspective view showing a data cartridge according to a second embodiment according to the present invention.

The data cartridge 40 of the second embodiment, shown in FIG. 11, has a base plate 4, on the front side of which columnar-shaped flanged guide pins 41A, 41A and tape guide members 42A, 42B are set upright. The magnetic tape 10, reeled out from the tape supply reel 11A, is placed around these guide pins and guide members.

Figure 12:
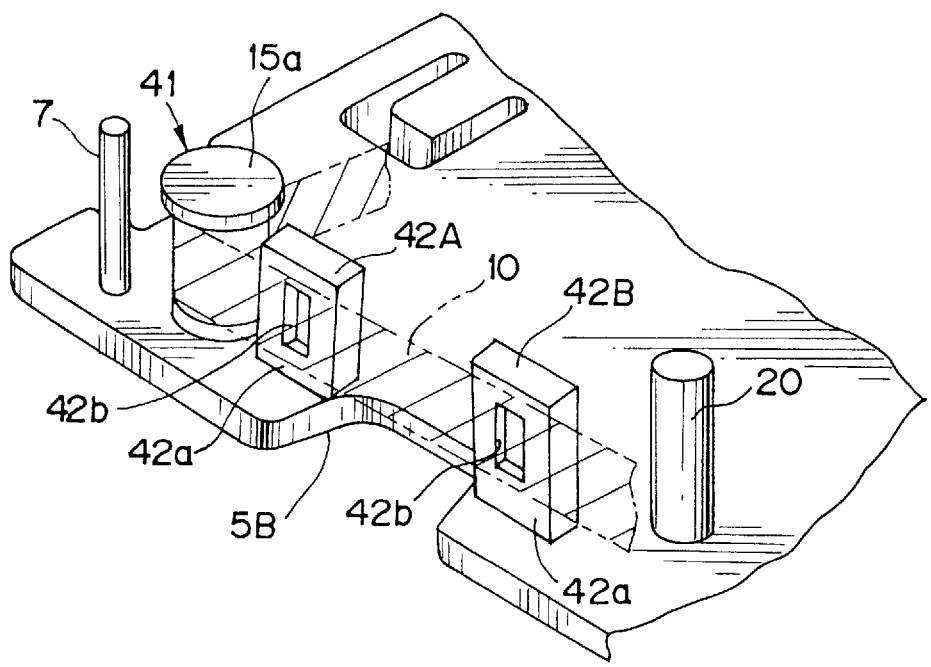
FIG. 12 is a perspective view showing a tape guide member of the data cartridge.

The tape guide members 42A, 42B are arranged on both sides of the cut-out 5A in the base plate 4 into which is intruded the magnetic head 33 of the recording/reproducing apparatus 30, as shown in FIG. 12. The tape guide members 42A, 42B are formed from a metal material in a substantially rectangular shape slightly smaller in height than the thickness of the cartridge main portion 2.

Preferably, the tape guide members 42A, 42B are contacted with the magnetic tape 10 in such a manner that the magnetic tape slide surfaces 42a, 42a thereof contacted with the magnetic tape 10 will be spaced from the magnetic tape 10 a distance of approximately 1.0 mm or less and surface friction will not be increased excessively. The magnetic tape sliding surfaces 42a, 42a are of such a surface roughness that the maximum height of the irregularities from an imaginary centerline on both sides of the protrusions and recesses in the cross-sectional profile is not less than 0.8 $\mu$m for preventing the tape guide members from becoming stuck to the magnetic tape 10. The magnetic tape sliding surfaces 42a, 42a are formed with magnetic tape suction grooves 42b, 42b which are of a height smaller than the width of the magnetic tape 10 and of a width smaller than the length of the magnetic tape 10 in a portion along the length of the tape contacting with the sliding surfaces 42a, 42a. By way of an example, the tape suction grooves 42b, 42b are of a height of 4.0 mm, a width of 2.0 mm and a depth of 2.0 mm.

Figure 13:
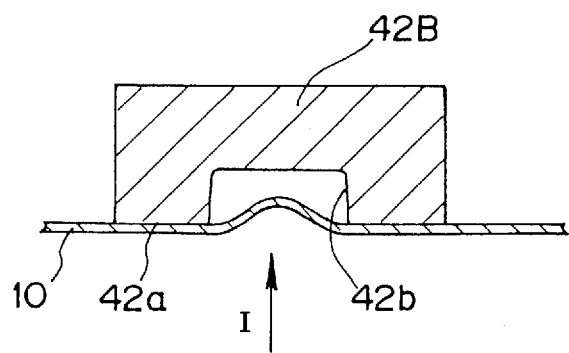
FIG. 13 is a schematic horizontal cross-sectional view showing the state of running of a magnetic tape around the tape guide member in the data cartridge.

If, with the above-described data cartridge 40, the magnetic tape 10 is run, there is generated a differential atmospheric pressure between the inside and the outside of the tape suction grooves 42c, 42c of the flanged guide pin, via the magnetic tape 10, as shown in FIG. 13. Thus the magnetic tape 10 is sucked in a direction indicated by arrow I in FIG. 13, so that the magnetic tape 10 is run in contact with the tape sliding surfaces 42a, 42a of the flanged guide pin. At this time, an air film layer is produced in the data cartridge 40 between the tape sliding surfaces 41b of the flanged guide pin and the running magnetic tape 10 for preventing the friction between the tape and the tape slide surfaces.

With the data cartridge 40, the magnetic tape 1 is damped in its vibrations in the directions of tape tension and width and in the tape running direction, under the force of suction exerted by the tape suction grooves 42b, 42b of the tape guide members 42A, 42B on the magnetic tape 10, for allowing the magnetic tape 10 to run in a stable state. Thus the data cartridge 49 runs with the magnetic tape held taut between the tape guide members.

Figure 14:
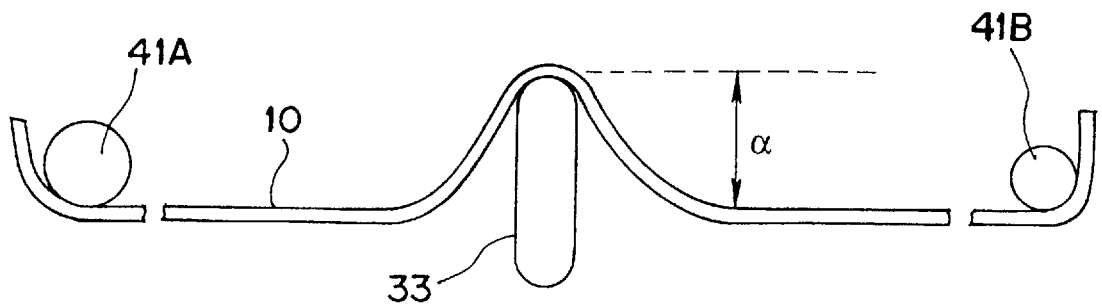
FIG. 14 is a schematic view for illustrating the amount of thrusting of the magnetic head with respect to the magnetic tape in the data cartridge.

With the data cartridge 40, it has been experimentally shown that, even under an adverse condition of a smaller thrusting amount $\alpha$ of the magnetic head 33 against the magnetic tape 10, the magnetic tape 10 can be run in a state of damped vibrations, as shown in FIG. 14.

Figure 15:
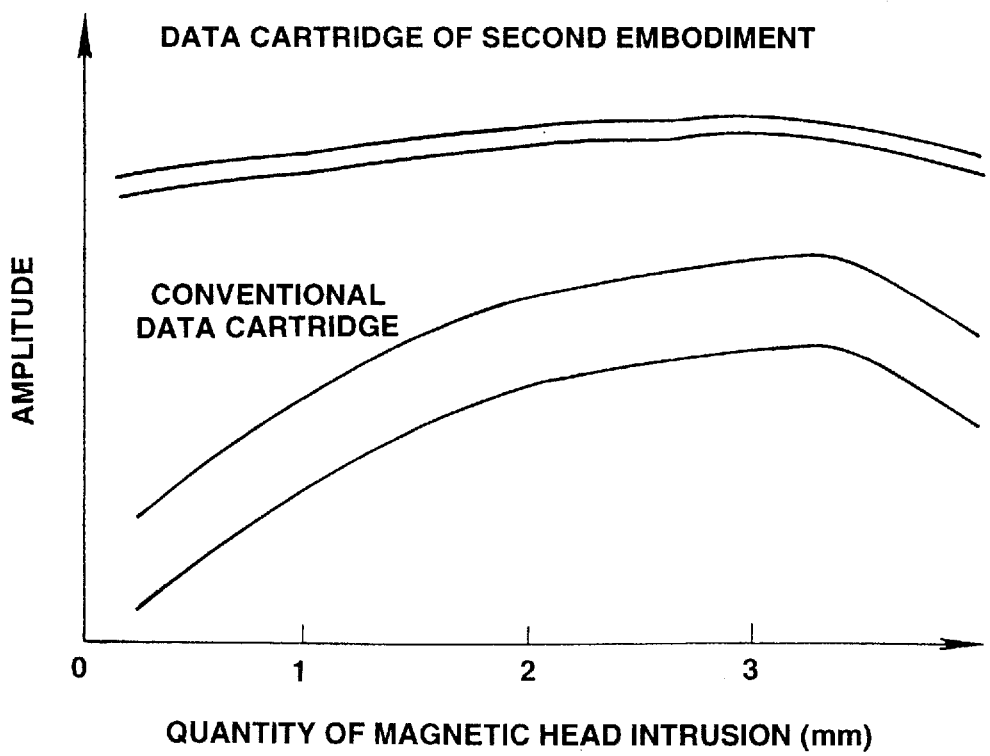
FIG. 15 is a graph for comparative illustration of the magnetic tape amplitude in the data cartridge.

These experimental results are obtained by comparing the amplitudes of the magnetic tapes 10 of the data cartridge 40 of the second embodiment and a conventional data cartridge, as shown in FIG. 15. It has been shown that, with the data cartridge 40 of the second embodiment, the amplitude of the magnetic tape 10 of the data cartridge 40 of the second embodiment is significantly smaller than with the conventional data cartridge even if the thrusting amount a of the magnetic head 33 against the magnetic tape 10 is within 0.0 to 3.0 mm.

It has also been experimentally shown that, with the data cartridge 40, a larger value of the contact area of the magnetic tape 10 with the magnetic head 33 may be maintained in stability even under an adverse condition of a smaller value $\alpha$ of the thrusting amount of the magnetic head 33 against the magnetic tape 10.

Figure 16:
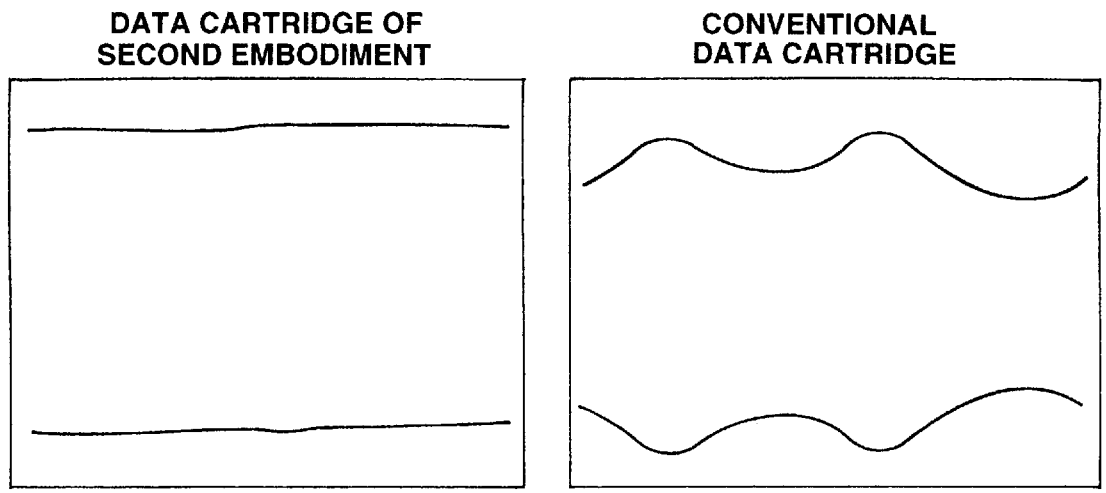
FIG. 16 is a graph for comparative illustration of the contact area of the magnetic tape with the magnetic head.

These experimental results are obtained by comparing the contact area in the tape tension direction of the magnetic tape 10 of the data cartridge 40 of the second embodiment to that of the magnetic tape 10 of the conventional data cartridge, as shown in FIG. 16. It has been shown that, with the data cartridge 40 of the second embodiment, a larger value of the contact area of the magnetic tape 10 with the magnetic head 33 than that in the case of the conventional data cartridge may be maintained in stability in case the thrusting amount $\alpha$ of the magnetic head 33 against the magnetic tape 10 is 2.0 mm.

Thus, with the data cartridge 40 of the second embodiment, the magnetic head 33 may be reliably contacted with the magnetic tape 10 even if the amount of thrusting $\alpha$ of the magnetic head 33 against the magnetic tape 10 is within 0.0 to 5.0 mm.

Figure 17:
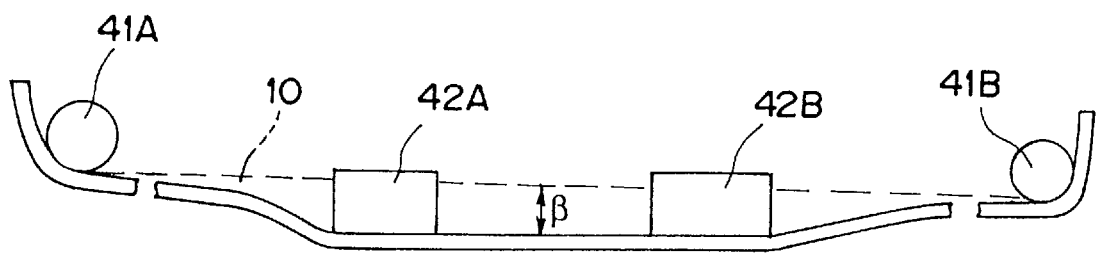
FIG. 17 is a schematic view for illustrating the amount of thrusting of the tape guide member with respect to the magnetic tape.

Also, with the data cartridge 40, it has been shown from the first and second experimental results that, as shown in FIG. 17, the magnetic tape 10 can be run under the state of damped oscillations of the magnetic tape 10 even under an adverse condition of a smaller value of the amount of extrusion $\beta$ of the tape guide members 42A, 42B against the magnetic tape 10.

Figure 18:
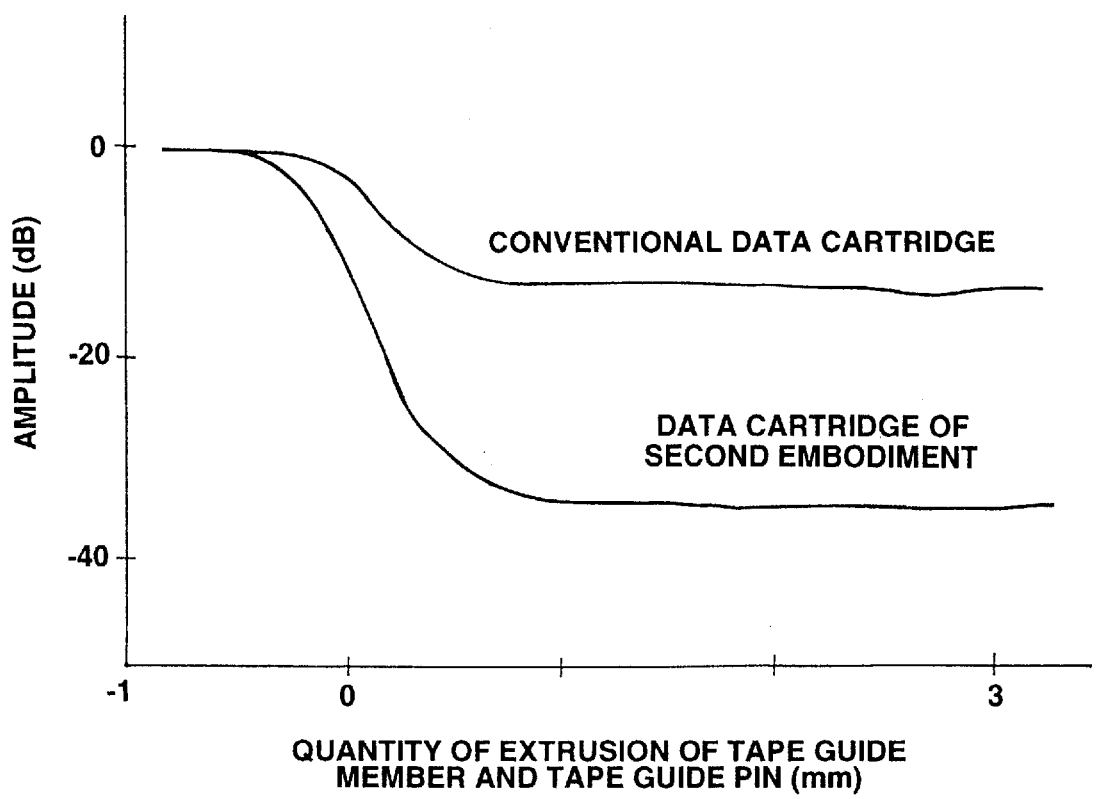
FIG. 18 is a graph for comparative illustration of the amplitude in the magnetic tape tensioning direction in the data cartridge.

The first experimental results may be obtained by comparing the amplitudes in the tape tensioning direction of the magnetic tapes 10 of the data cartridge 40 of the second embodiment to those of the conventional data cartridge as shown in FIG. 18. In the data cartridge 40 of the second embodiment, the amplitude damping effect for the magnetic tape 10 is produced for the amount of extrusion $\beta$ of the tape guide members 42A, 42B with resect to the magnetic tape members 42A, 42B equal to −0.1 mm, with the amplitude damping effect for the magnetic tape 10 being increased rapidly for the amount of extrusion β of 0.0 mm. Thus it can be confirmed that the amplitude of the magnetic tape 10 is smaller by approximately −20 dB than the conventional data cartridge.

Figure 19:
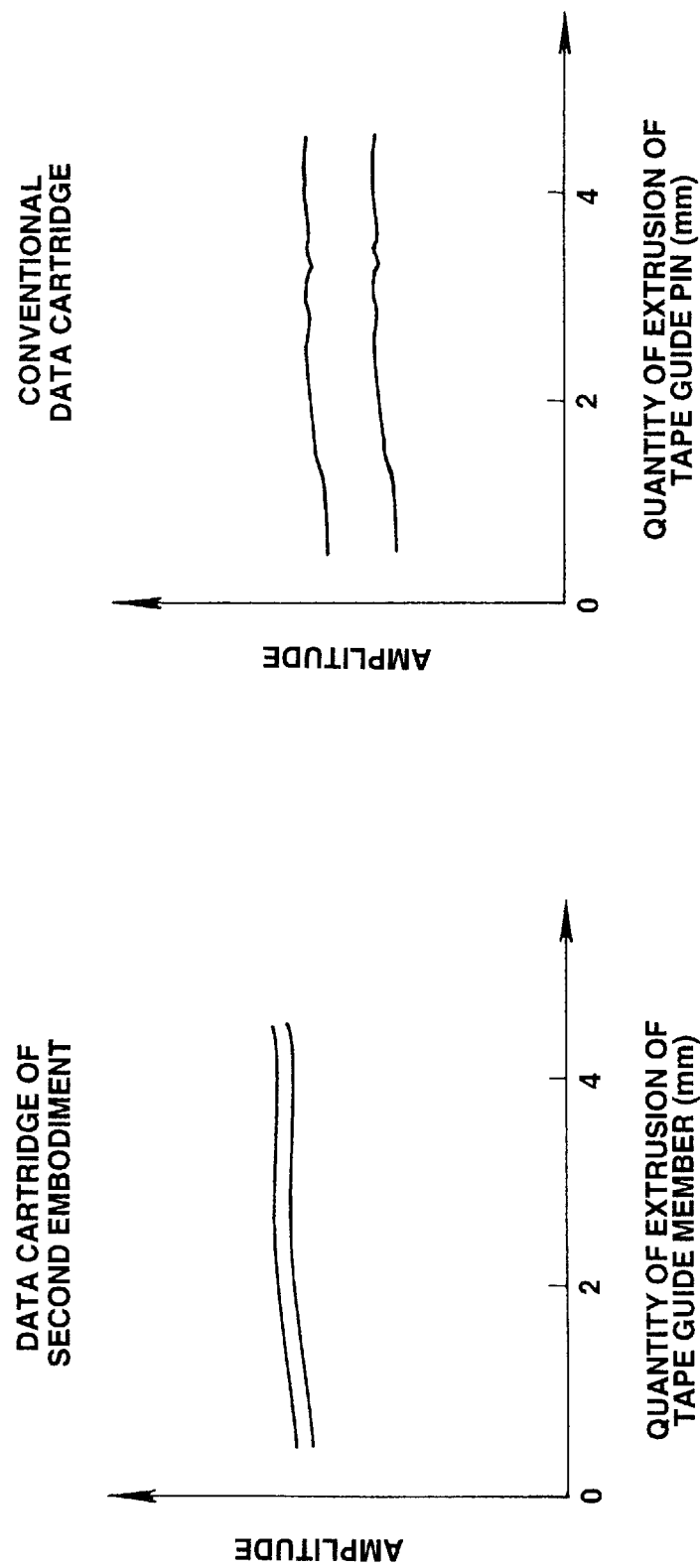
FIG. 19 is a graph for comparative illustration of the amplitude along the magnetic tape width in the data cartridge.

The second experimental results can be obtained by comparing the amplitude in the direction of width of the magnetic tape 10 of the second embodiment to that of the conventional data cartridge as shown in FIG. 19. It may be confirmed that, with the data cartridge 40 of the second embodiment, the amplitude of the magnetic tape 10 is significantly smaller than that of the conventional data cartridge even if the amount of extrusion β of the tape guide members 42A, 42B with respect to the magnetic tape is within a range of 0.0 to 4.0 mm.

It has also been shown that, with the data cartridge 40, a larger value of the contact area of the magnetic tape 10 with respect to the magnetic head 33 may be maintained in stability even under an adverse condition of a smaller thrusting amount β of the tape guide members 42A, 42B against the magnetic tape 10.

Figure 20:
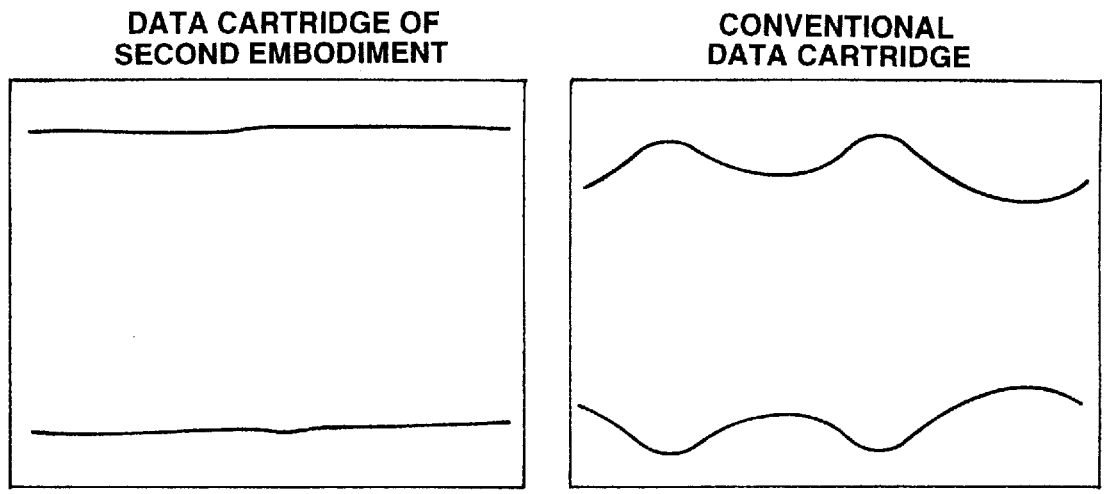
FIG. 20 is a graph for illustrating the amount of thrusting of the tape guide member with respect to the magnetic tape.

These experimental results may be obtained by comparing the contact area in the tape tension direction of the magnetic tape 10 of the data cartridge 40 of the second embodiment with that of the conventional data cartridge as shown in FIG. 20. It may be confirmed that, with the data cartridge of the second embodiment, a larger value of the contact area of the magnetic tape 10 with the magnetic head 33 than that with the conventional data cartridge may be obtained in stability in case the thrusting amount β of the tape guide members 42A, 42B against the magnetic tape 10 is 1.0 mm.

Thus, with the data cartridge of the second embodiment, the magnetic head 33 may be reliably contacted with the magnetic head 10 even if the thrusting amount β of the tape guide members 42A, 42B against the magnetic tape 10 is in a range from −0.1 to 5.0 mm.

The tape cartridge 40 is allowed to run along the front side of the cartridge main portion 2 under a constant tape tension of the running magnetic tape 10 against the magnetic head 33, so that data signals may be recorded or read out on the magnetic tape 10 by the magnetic head 33 reliably contacted with the magnetic tape 10.

With the above-described second embodiment of the data cartridge 40, in which the tape guide members 42A, 42B are formed with the magnetic tape suction grooves 42b, 42b, the running magnetic tape 10 is sucked by the magnetic tape suction grooves 42b, 42b for damping the vibrations of the magnetic tape 10 in the direction of tape tension and tape width and in the tape running direction for stabilizing recording/reproducing characteristics for the magnetic tape 10, thereby positively preventing data errors from occurrence.

Moreover, with the data cartridge 40, in which the tape guide members 42A, 42B are formed on both sides of the cut-out 5B in the base plate 4, the tape tension of the magnetic tape 10 on the magnetic head 33 is increased for assuring reliable contact of the magnetic head 33 with the magnetic tape 10 thereby preventing data errors from occurrence.

The result is that, with the data cartridge 40, the magnetic tape 10 is run in stable state and the recording frequency may be set to a higher value for increasing the number of recording tracks on the magnetic tape 10 for increasing the recording capacity.

In the data cartridge 40 of the second embodiment, a large number of magnetic tape suction openings in the form of substantially semi-circular recesses may be provided in the magnetic tape guide members 42A, 42B in their entirety. Also, in the data cartridge 40 of the second embodiment, a large number of magnetic tape suction openings, formed as elongated grooves with different lengths of the magnetic tape 10 along the width of the magnetic tape 10, may be provided in the magnetic tape guide members 42A, 42B in their entirety.

Figure 21:
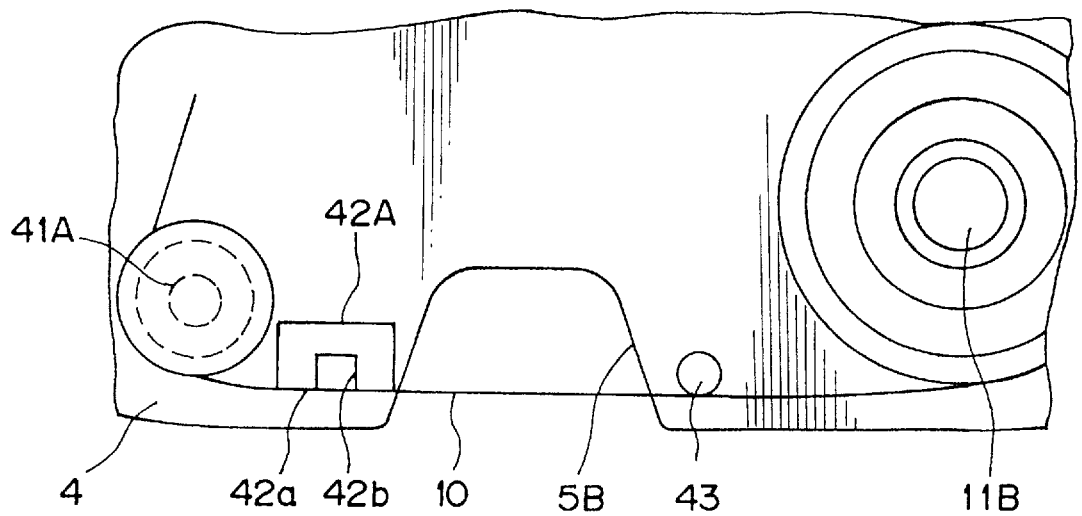
FIG. 21 is a schematic plan view showing a modification of the data cartridge.

In the data cartridge 40 of the second embodiment, the tape guide members 42A, 42B are provided on both sides of the cut-out 5A of the base plate 4 into which is intruded the magnetic head 33 of the recording/reproducing apparatus 30. However, it is also possible to provide a sole tape guide member 42 on one side of the cut-out 5B of the base plate 4 and to provide a sole tape guide pin 43 on the other side of the cut-out 5B, as shown in FIG. 21.

Figure 22:
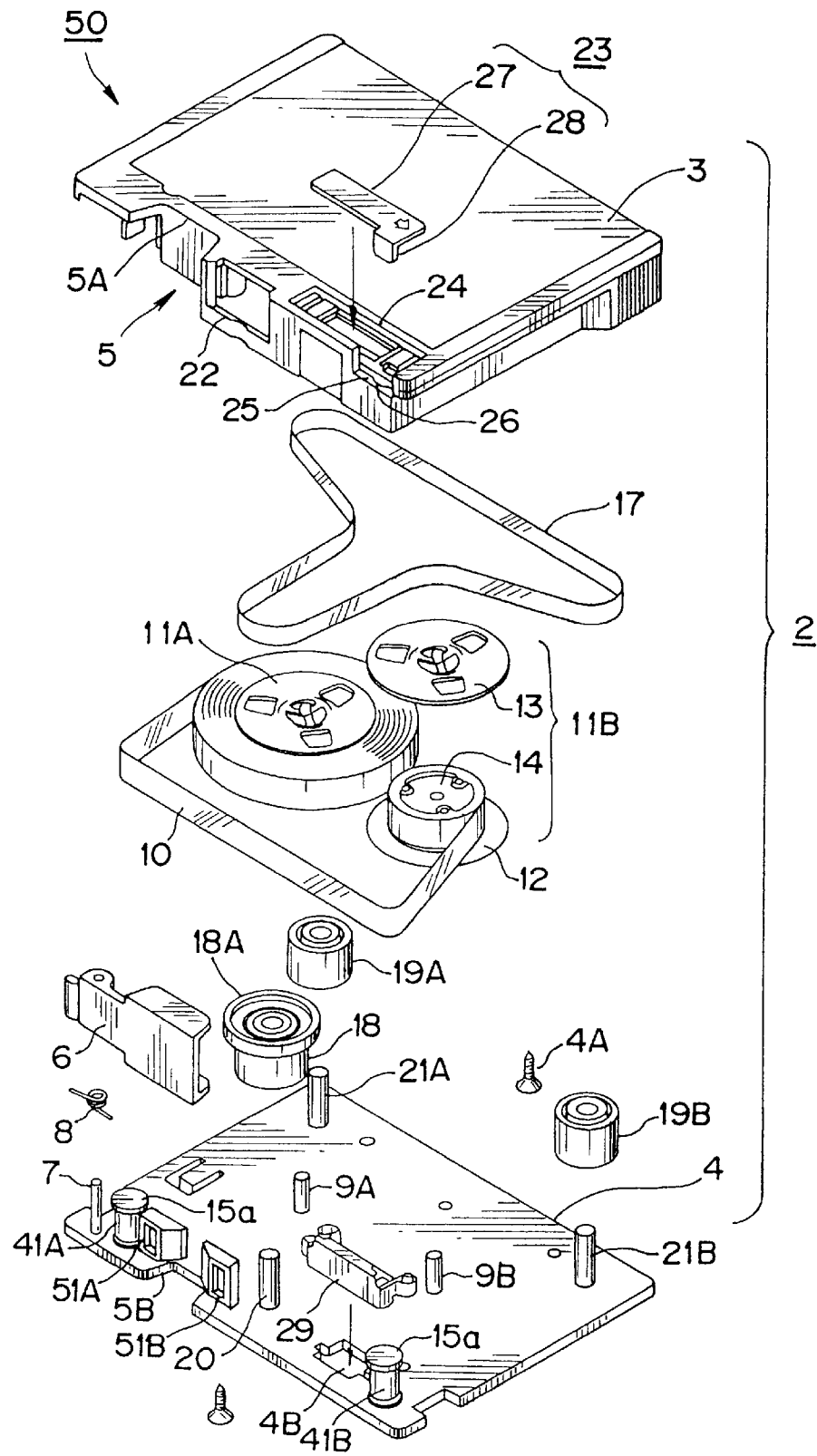
FIG. 22 is an exploded perspective view of a data cartridge according to a third embodiment of the present invention.

A data cartridge 50 according to a third embodiment has a basic structure similar to that of the data cartridge 40 of the second embodiment, as shown in FIG. 22. In the following description, the parts or components similar to those of the data cartridge 40 of the above-described second embodiment are denoted by the same reference numerals as the detailed description is not made for clarity.

Figure 23:
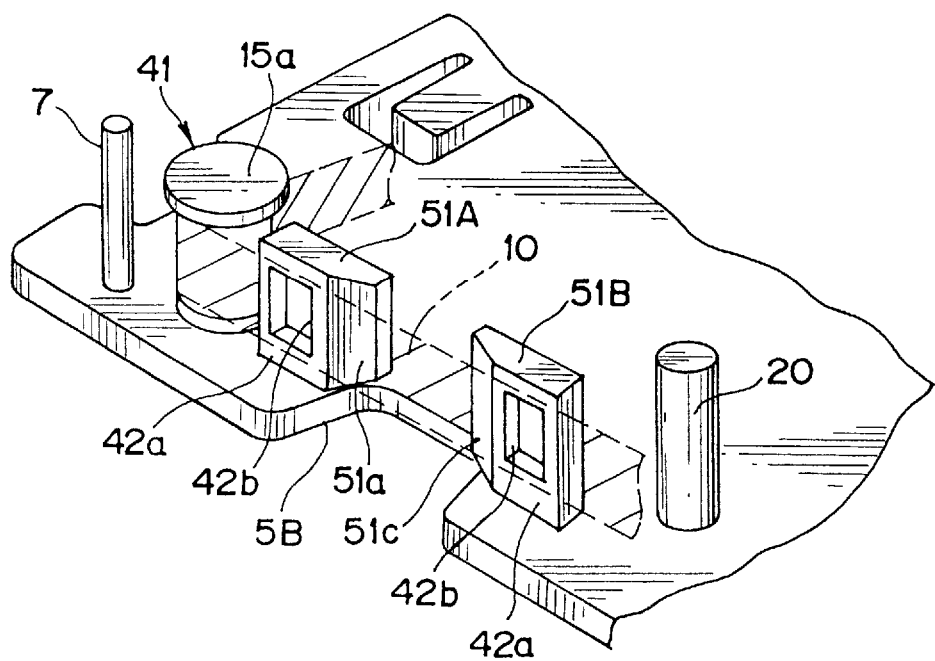
FIG. 23 is a perspective view showing a tape guide member of the data cartridge.

On the left and right sides of the cut-out 5B in the base plate 4, into which is intruded the magnetic head 33 provided on the recording/reproducing apparatus 30, there are provided a first tape guide member 51A and a second tape guide member 51B, respectively, as shown in FIG. 23. These tape guide members 51A, 51B are formed of metal and are formed as substantially rectangular plates each having a height slightly smaller than the thickness of the cartridge main portion 20.

These tape guide members 51A, 51B are formed respectively with inclined portions 51a, 51c facing the cut-out 5B formed in the base plate 4. These inclined portions 51a, 51c are inclined from the surfaces thereof facing the magnetic tape 10 towards the cut-out 5B in the base plate 4.

Figure 24:
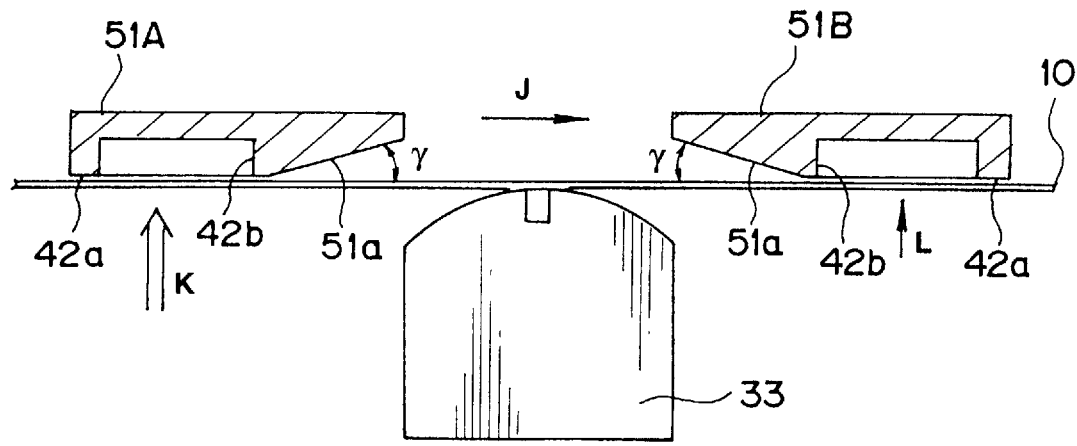
FIG. 24 is a schematic horizontal cross-sectional view for illustrating the state in which the magnetic tape runs in a forward direction along the tape guide member in the data cartridge.

With the above-described disc cartridge 50, if the magnetic tape 10 is run in a forward direction as indicated by arrow J in FIG. 24, the force of suction exerted by the first tape guide member 51A on the magnetic tape 10 in a direction indicated by arrow K in FIG. 24 becomes larger than the force of suction exerted by the second tape guide member 51B on the magnetic tape 10 in a direction indicated by arrow L in FIG. 24.

Thus, with the data cartridge 50, the first tape guide member 51A damps the vibrations in the direction of tension and width of the magnetic tape 10 and in the running direction of the magnetic tape 10 to permit the magnetic tape 10 to run in stable condition, while the second tape guide member 51B reduces the frictional resistance on the magnetic tape 10 to permit smooth running of the magnetic tape 10.

Figure 25:
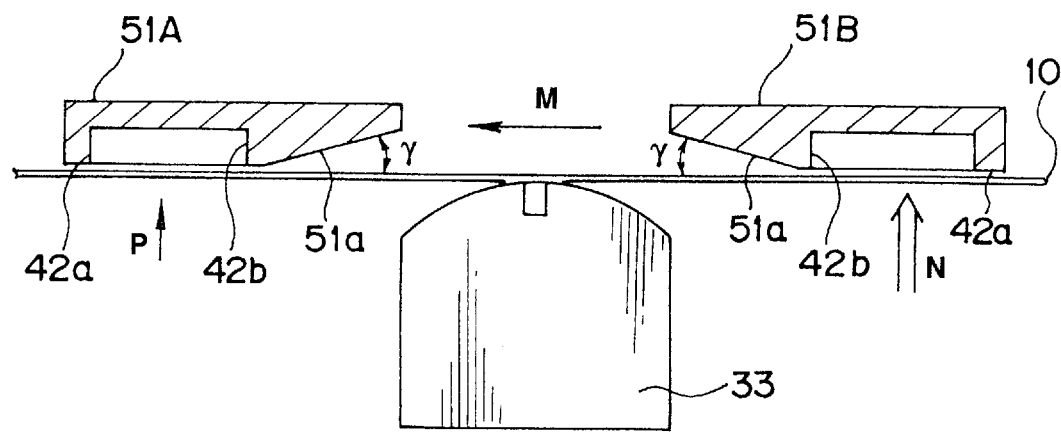
FIG. 25 is a schematic horizontal cross-sectional view for illustrating the state in which the magnetic tape runs in a reverse direction along the tape guide member in the data cartridge.
Figure 26:
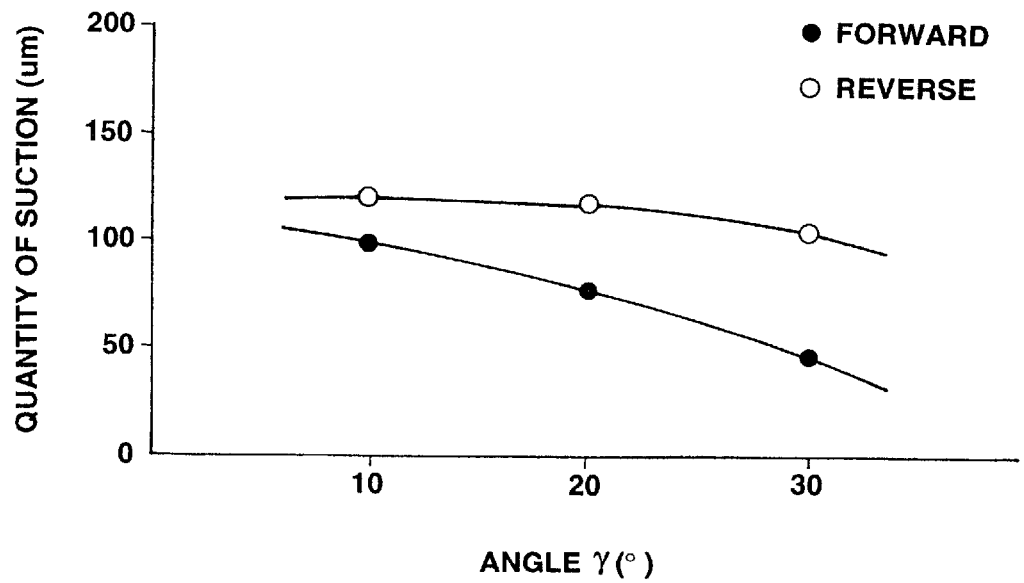
FIG. 26 is a graph for illustrating variation in the amount of suction for the magnetic tape by the angle of the inclined portion of the magnetic tape guide member.

Also, with the data cartridge 50, if the magnetic tape 10 runs in the opposite direction indicated by arrow M in FIG. 25, the force of suction exerted by the second tape guide member 51B on the magnetic tape 10 indicated by arrow N in FIG. 25 becomes lager than the force of suction exerted by the first tape guide member 51A on the magnetic tape 10 in a direction indicated by arrow P in FIG. 25.

Thus, with the data cartridge 50, the second tape guide member 51A damps the vibrations in the direction of tension and width of the magnetic tape 10 and in the running direction of the magnetic tape 10 to permit the magnetic tape 10 to run in stable condition, while the first tape guide member 51A reduces the frictional resistance on the magnetic tape 10 to permit smooth running of the magnetic tape 10.

Thus, in the data cartridge 50, the running magnetic tape 10 runs along the front side of the cartridge main portion 2 as the constant tape tension of the running magnetic tape 10 on the magnetic head 33 is kept constant. By the magnetic head 33, reliably contacted with the magnetic tape 10, data signals are recorded and read out reliably with respect to the magnetic tape 10.

With the above-described third embodiment of the data cartridge 50, in which the tape guide members 51A, 51B are provided on both sides of the cut-out 5B in the base plate 4, the tape tension exerted by the magnetic head 33 on the magnetic head 33 is increased, thus permitting the magnetic head 33 to be contacted with the magnetic tape 10 to prevent data errors from occurrence.

In addition, with the data cartridge 50, since the inclined portions 51a, 31a are formed on the tape guide members 51A, 51B, respectively, the frictional resistance against the magnetic tape 10 at the magnetic suction grooves 51a, 51a is reduced after the turning magnetic tape 10 is contacted with the magnetic head 33, thus smoothing the running of the magnetic tape 10.

Moreover, with the data cartridge 50, in which the angle γ of the inclined portions 51a, 51a of the tape guide members 51A, 51B is adjusted as shown in FIGS. 24 and 25, the force of suction of the tape guide members 51A, 51B on the magnetic tape 10 is varied for enabling the tape tension of the magnetic tape 10 to be adjusted with respect to the magnetic head 33.

Thus, with the data cartridge 50, the magnetic tape 10 is run in stable condition to permit the recording frequency to be set to a higher value for increasing the number of the recording tracks of the magnetic tape 10 and hence the recording capacity.

Figure 27:
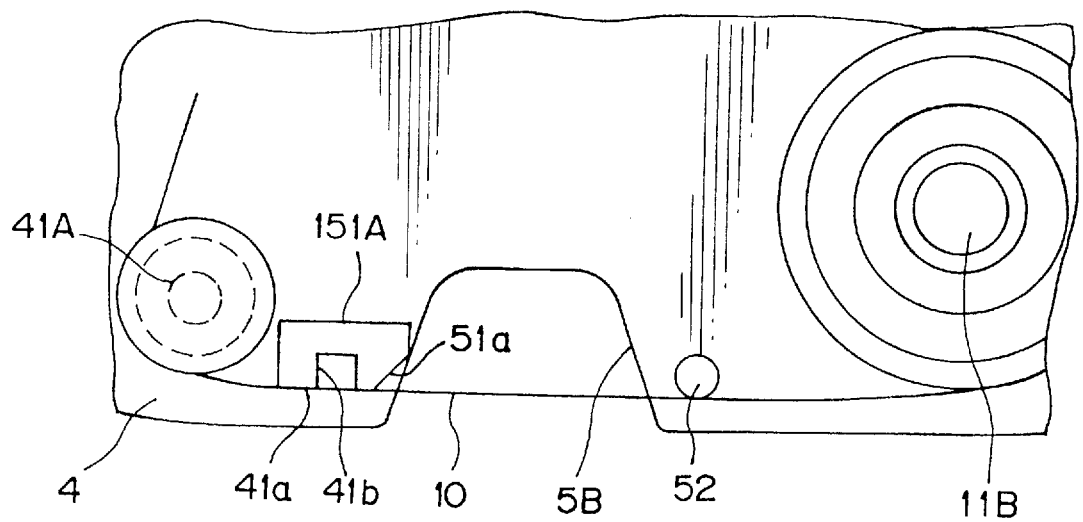
FIG. 27 is a schematic plan view showing a modification of the data cartridge.

In the third embodiment of the data cartridge 50, the tape guide members 51A, 51B are provided on both sides of the cut-out 5B in the vase plate 4, into which is intruded the magnetic head 33 provided on the recording/reproducing apparatus 30, as shown in FIG. 27, it is also possible to provide the tape guide member 51A and the sole tape guide pin 52 on one and the other sides of the cut-out 5b formed in the base plate 4, respectively.

The present invention may be applied to a recording head for a tape cartridge having a magnetic tape of any one of a variety of tape widths, such as 4 mm, 8 mm, ¼", ¾" or 1", a taper cartridge for audio or a tape cartridge for a video tape recorder, in addition to the above-mentioned magnetic head.

Referring to FIGS. 28 to 36, an illustrative embodiment of a magnetic head according to the present invention will be explained in detail. A magnetic head 60, as a first embodiment, is mounted on a driving unit which is connected to a computer or the like for sucking or feeding back data signals accumulated in a memory unit on the main body portion, as shown in FIGS. 28 to 32.

Figure 28:
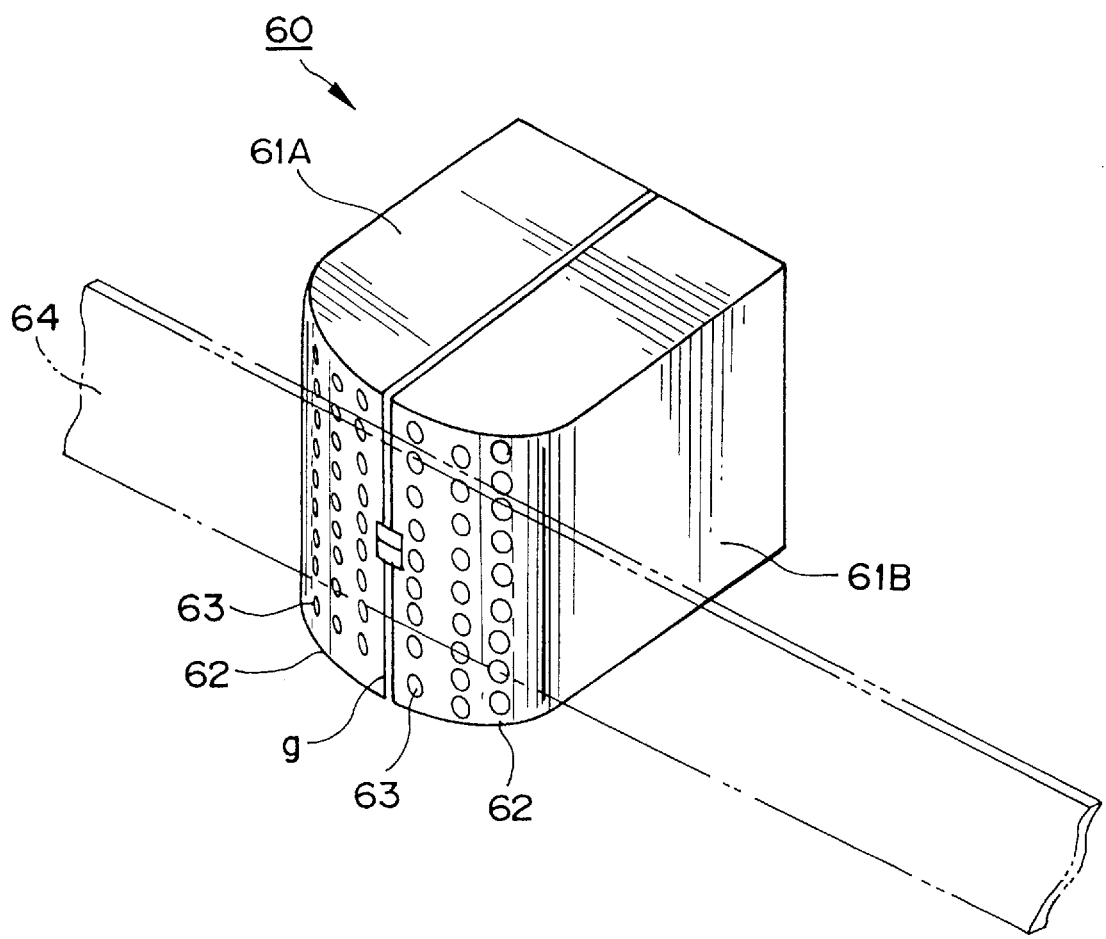
FIG. 28 is a schematic perspective view showing a magnetic head according to a first embodiment of the present invention.

The magnetic head 60 has a pair of magnetic core halves 61A, 61b formed of, for example, a magnetic material, such as sendust, permalloy, ferrite or amorphous, as shown in FIG. 28. The magnetic head 60 has a height larger than the width of the magnetic tape 63 and a size large enough to enter the recording/reproducing aperture in the data cartridge, not shown.

The magnetic core halves 61A, 61B of the magnetic head 60 are transversely symmetrical to each other with the abutting surfaces thereof as a boundary. The magnetic core halves 61A, 61B are abutted to each other for forming a closed magnetic path to form a magnetic core. The magnetic head 60 has a magnetic gap material g on the abutting surfaces of the magnetic core halves 61A, 61B. A gap spacer material in the form of a thin plate formed e.g., of titanium or beryllium copper, may be interposed as the magnetic gap material g for increasing the strength of the magnetic field.

Figure 29:
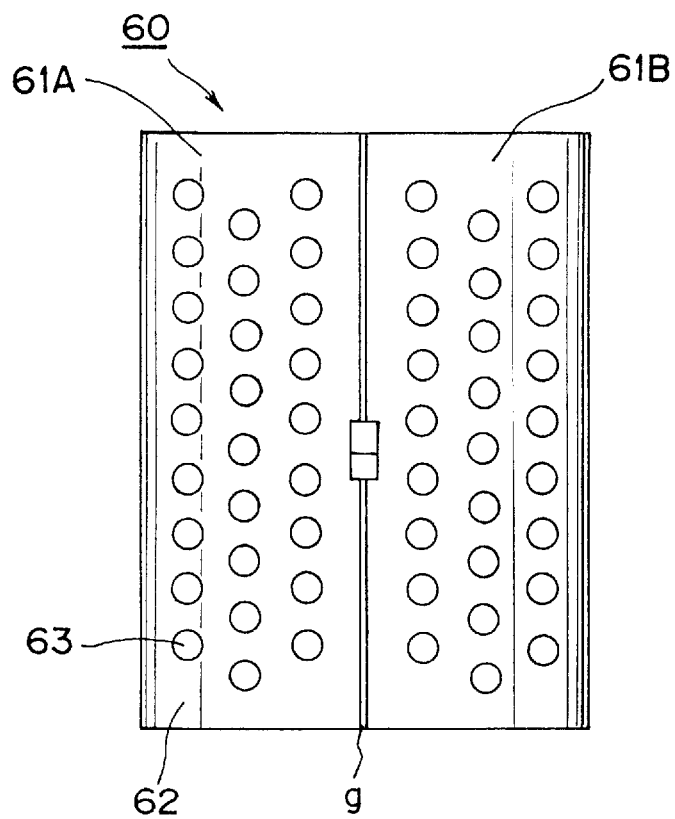
FIG. 29 is a front view showing the magnetic head.

The magnetic head 60 has a curved contact surface 62 for contacting with the magnetic tape 64. The curved contact surface 62, curved in the running direction of the magnetic tape 64, has a surface roughness such that the maximum height of the protrusions from a centerline, on both sides of which the areas of the protrusions and recesses are equal to each other, is not less than 0.8 μm for preventing the curved contact surface from becoming affixed to the magnetic tape 64. The contact surface 62 has a large number of magnetic tape suction recesses 63 extending on the entire surface in the direction of tape width and in the running direction of the magnetic tape 64, as shown in FIG. 29. These suction recesses 63 are formed substantially as semi-spherical recesses.

Figure 30:
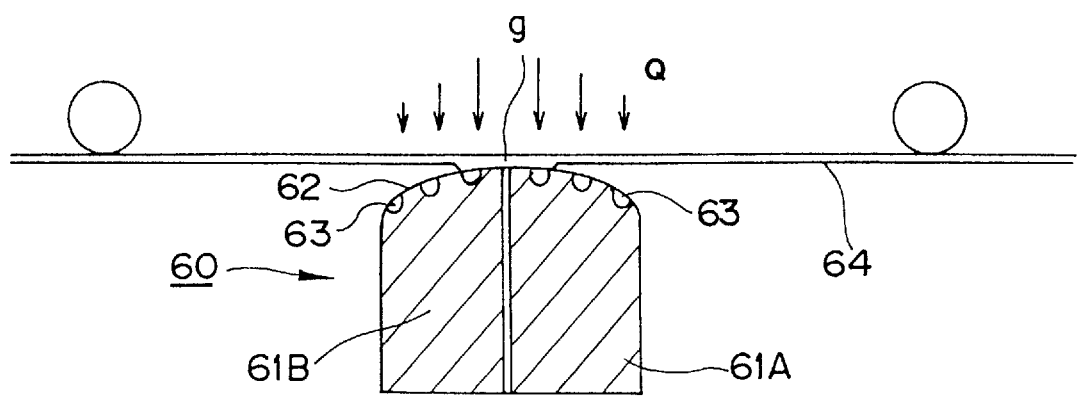
FIG. 30 is a schematic horizontal cross-sectional view for illustrating the state of the magnetic tape running in the magnetic head.

When the data cartridge is loaded in the inside of the cartridge inserting aperture of the driving unit, the curved contact surface 62 is slightly contacted with the magnetic tape 64, so that the suction recesses 63 formed in the curved contact surface 62 are closed by the magnetic tape 64, as shown in FIG. 30. When the magnetic tape 64 runs in a slightly contacted state, there is produced a difference in atmospheric pressure between the inside and the outside of the magnetic tape 64 for sucking the tape as indicated by arrow Q in FIG. 30.

Thus, by the force of suction exerted by the tape suction recesses 63 on the magnetic tape 64, the magnetic head 60 damps the vibrations of the magnetic tape 64 in the direction of tape tension and width and in the running direction of the magnetic tape 64 for allowing the magnetic tape 64 to run in stable condition. At this time, an air film layer is produced between the curved contact surface 62 and the running magnetic tape 64, thus preventing friction from being produced.

It has experimentally shown that, with the magnetic head 60, a large contact area with the magnetic tape 64 may be maintained in stability even under an adverse condition in which the tape tension as a resistive force exerted by the magnetic tape 64 is small.

Figure 1:
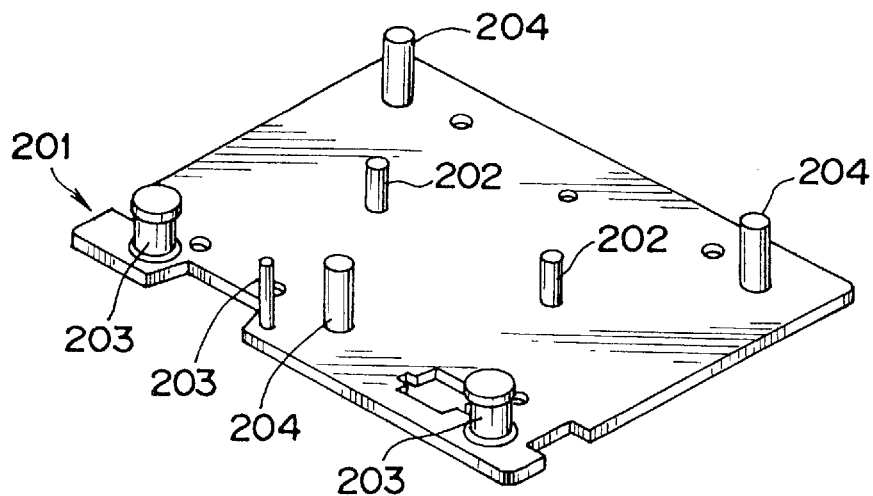
FIG. 1 is a perspective view showing a base plate of a conventional data cartridge.
Figure 2:
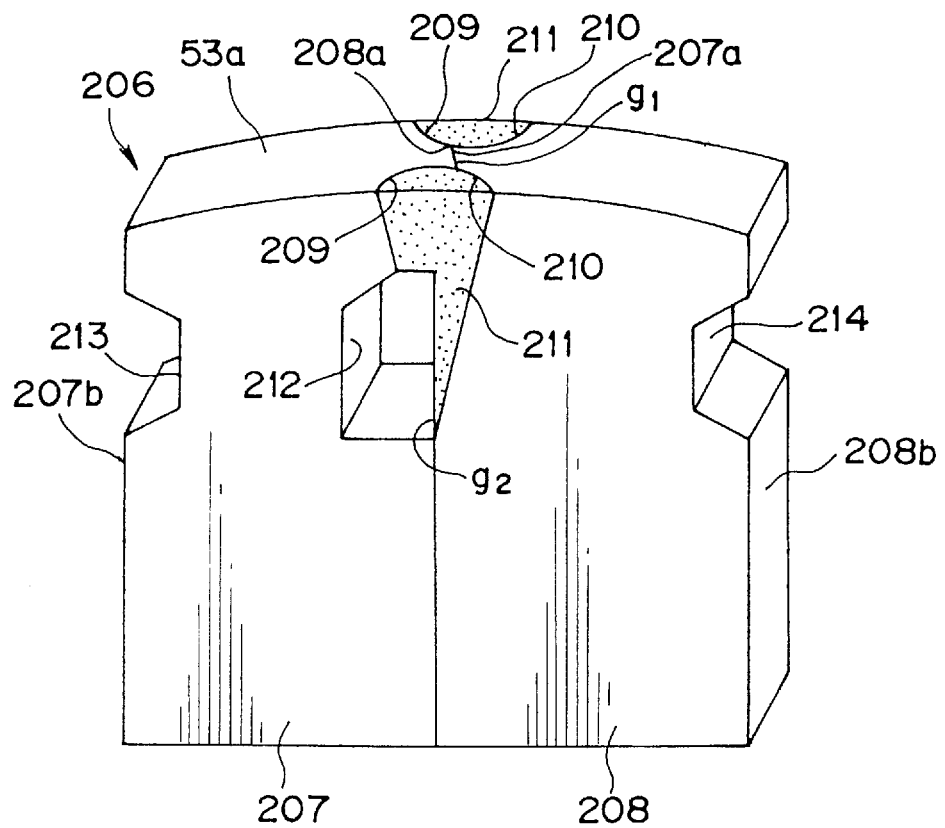
FIG. 2 is a perspective view of a conventional magnetic head.
Figure 3:
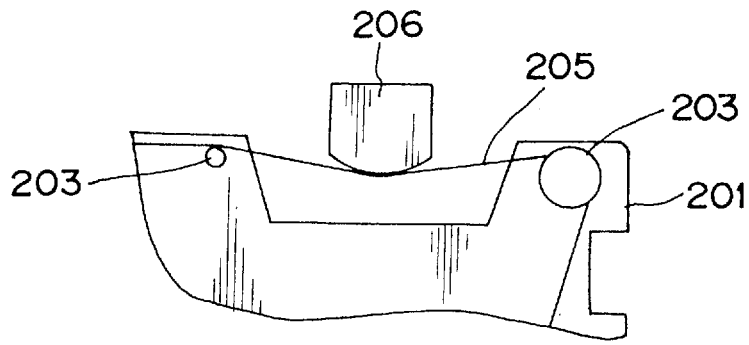
FIG. 3 is a schematic plan view showing the contact state between the magnetic head and the magnetic tape of a conventional data cartridge.
Figure 4:
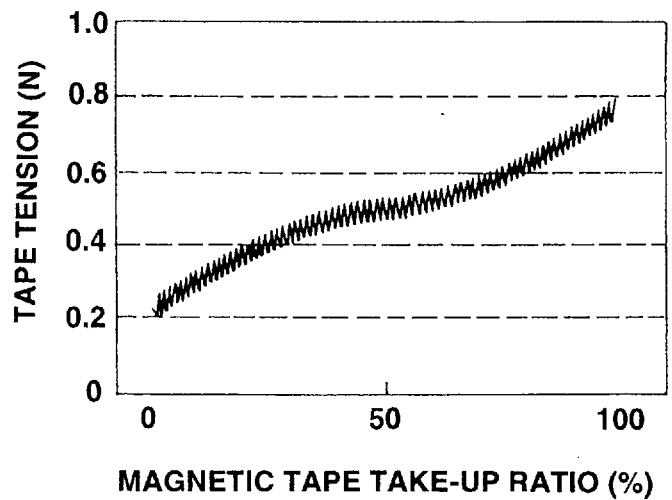
FIG. 4 is a graph showing the tape tension and the tape take-up ratio for the magnetic tape by the conventional data cartridge.
Figure 5:
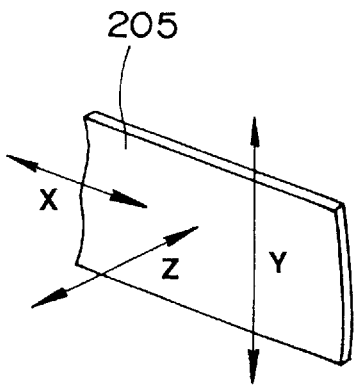
FIG. 5 is a schematic perspective view of explaining the direction of vibrations of a conventional data cartridge.
Figure 31:
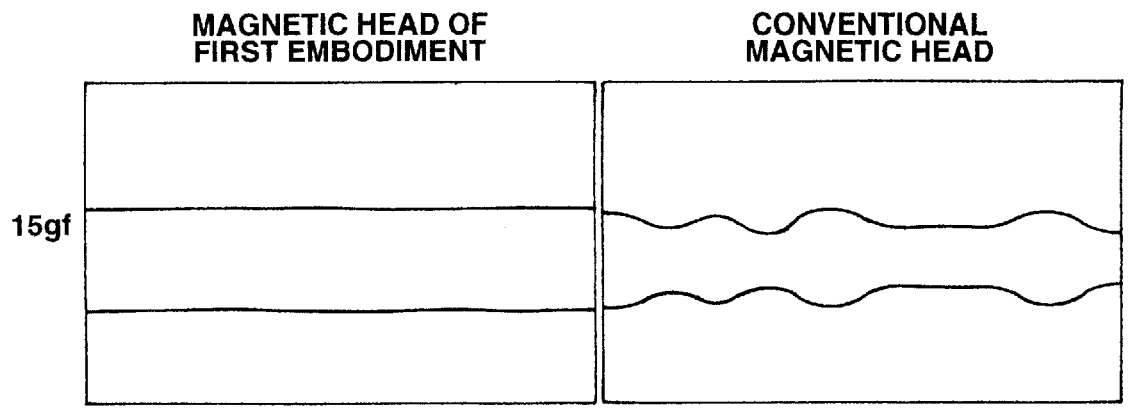
FIG. 31 is a graph for illustrating comparison of the contact area of the magnetic tape with respect to the magnetic head.

These experimental results correspond to a graph of FIG. 31 showing the contact area in the tape tension direction of the magnetic tape 64 for the magnetic head 60 of the first embodiment and that of the convectional magnetic head. It is seen from FIG. 3 that, if the tape tension as a resistive force exerted by the magnetic tape 64 is 25 gf in the magnetic head 60 of the first embodiment, the contact area in the tape tension direction of the magnetic tape 64 is larger and more stable than that with the conventional magnetic head.

Thus, with the magnetic head 60, the magnetic tape 64 is positively contacted with the gap material g, as the tape tension of the running magnetic tape 64 is kept constant, for recording or reading data signals on the magnetic tape 64.

Figure 32:
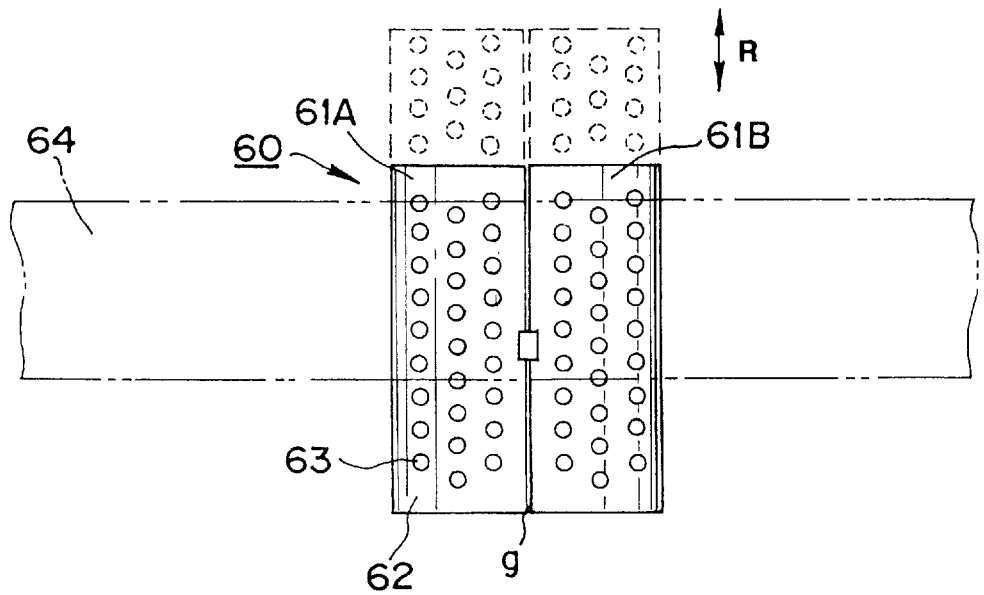
FIG. 32 is a front view showing the sliding state of the magnetic head.

When the running direction of the magnetic tape 64 is switched from the forward direction to the reverse direction or vice versa, the magnetic tape 60 is slid along the width of the magnetic tape 64 as indicated by arrow R in FIG. 32 for selectively scanning the upper recording track portion and the lower recording track portion for recording or reading data signals by the gap material g. At this time, the magnetic head 60 damps the vibrations in the direction of tension and width and in the direction of tension of the magnetic tape 64, under the force of suction exerted by the magnetic tape suction recesses 63 on the magnetic tape 64, thus permitting the magnetic tape 64 to run in stable condition.

With the above-described first embodiment of the magnetic head 60, a large number of the magnetic tape suction recesses 63 are formed in the tape contact curved surface 62 for sucking the running magnetic tape 64 by the suction recesses 63 for controlling the vibrations in the direction of tension and width and in the running direction of the magnetic tape 64. The result is that the running properties of the magnetic tape 64 may be improved for stabilizing the recording/reproducing characteristics of the magnetic tape 64 for reliably prohibiting data errors from occurrence.

With the present magnetic head 60, in which the numerous suction recesses 63 are formed on the entire surface of the tape contact surface 62, the recording/reproducing characteristics of the totality of recording tracks of the magnetic tape 64 may be improved without regard to the relative position thereof with respect to the magnetic tape 64 for stabilizing the recording/reproducing characteristics for reliably preventing data errors from occurrence.

Thus it is possible for the magnetic head 60 to run the magnetic tape 64 in stable condition and to use a higher recording frequency for the magnetic tape 64 for increasing the number of recording tracks and hence the recording capacity of the magnetic tape 64.

Figure 33:
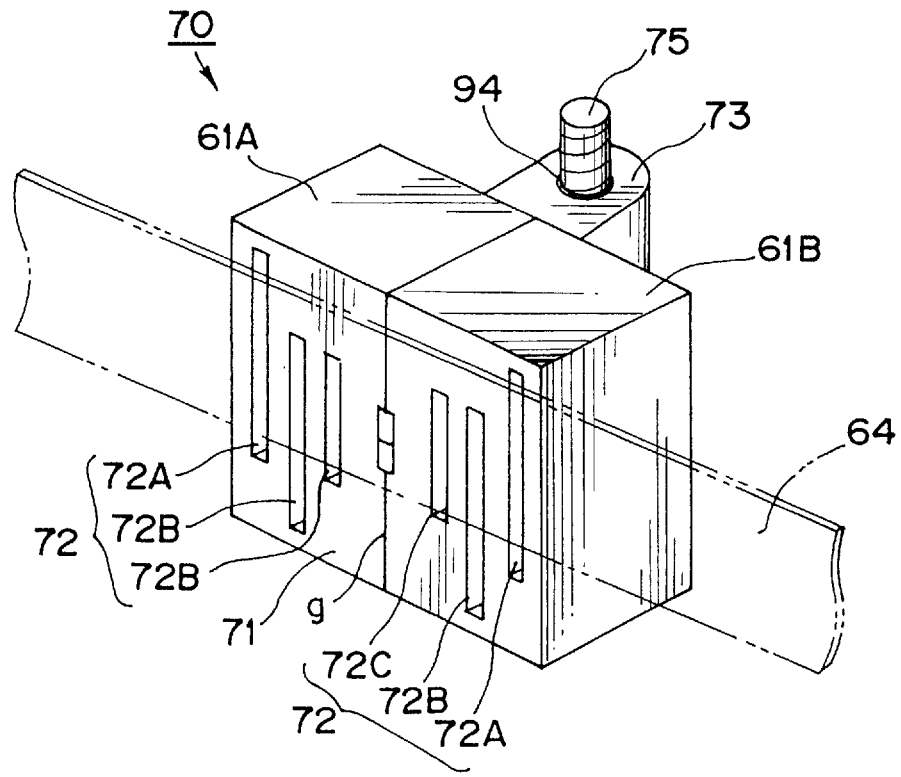
FIG. 33 is a schematic perspective view showing a magnetic head according to a second embodiment of the present invention.

A magnetic head 70 according to a second embodiment has a basic structure similar to that of the magnetic head 60 of the second embodiment, as shown in FIG. 33. In the following description, the parts or components similar to those of the magnetic head 60 of the above-described first embodiment are denoted by the same reference numerals and the detailed description is not made for clarity.

The magnetic head 70 has a planar magnetic tape contact surface 71 contacting the magnetic tape 64, as shown in FIG. 33. The magnetic tape contact surface 71 is of such a surface roughness that the maximum height of the irregularities from an imaginary centerline on both sides of the protrusions and recesses in the cross-sectional profile is not less than 0.8 µm for preventing the tape guide members from becoming stuck to the magnetic tape 10.

The magnetic tape contact surface 71 has tape suction grooves 72 as plural elongated grooves having different lengths along the width of the magnetic tape 64. These tape suction grooves 72 are formed as elongated rectangular recesses. The magnetic tape suction grooves 72 are comprised of a series of suction grooves comprised of a first suction groove 72A beginning from the upper side of the magnetic head 70 and extending downwards to a mid height position, a second suction groove 72B beginning from the lower side of the magnetic head 70 upwards to a mid height position and a third suction groove 72C formed at a mid portion. This series of the suction grooves are formed from each end of the magnetic head 70.

The magnetic head 70 is provided with a rod holder 73 on the back side of the magnetic tape contact surface 71. The rod holder 73 has a tapped hole 74 in which is screwed a spindle rod 75 secured to the distal end of a driving motor, not shown. Thus the magnetic head 70 is moved along the height by the rotational movement of the spindle rod 75 by the driving motor.

Figure 34:
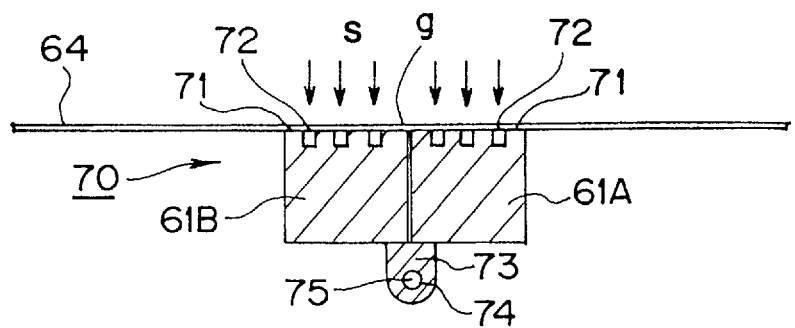
FIG. 34 is a schematic horizontal cross-sectional view for illustrating the state of running of the magnetic tape in the magnetic head.

If, with the above-described magnetic head 70, the data cartridge is loaded in the inside of the cartridge inserting opening of the driving unit, the tape contact surface 71 is slightly contacted with the magnetic tape 64, as shown in FIG. 34, so that the tape suction grooves 72 formed in the tape contact surface 71 are stopped by the magnetic tape 64.

If the magnetic tape 64 is moved in slight contact with the suction grooves 72, there is produced a difference in atmospheric pressure between the inside and the outside of the magnetic tape 64, thus sucking the tape in a direction indicated by arrow S in FIG. 34.

Thus, by the force of suction exerted by the tape suction grooves 72 on the magnetic tape 64, the magnetic head 70 damps the vibrations of the magnetic tape 64 in the direction of tension and width and in the running direction of the magnetic tape 64 for allowing the magnetic tape 64 to run in stable condition. At this time, an air film layer is produced between the contact surface 71 and the running magnetic tape 64, thus preventing friction from being produced.

Figure 35:
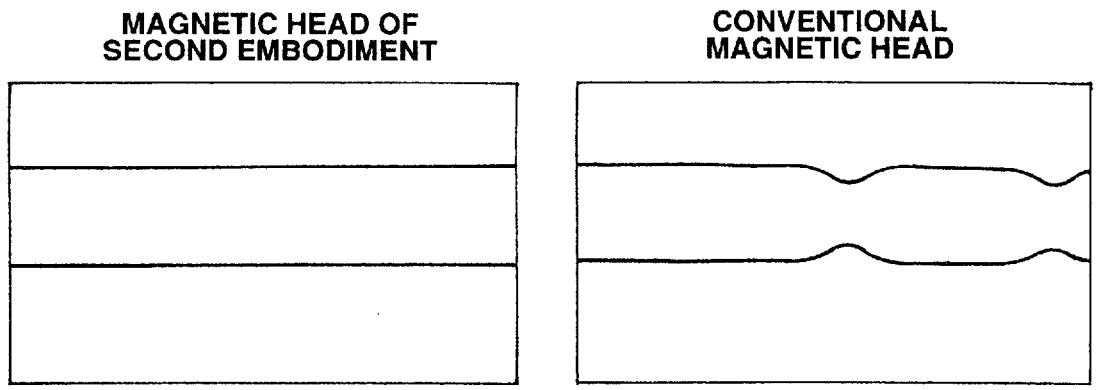
FIG. 35 is a graph for illustrating comparison of the contact area of the magnetic tape with respect to the magnetic head of FIG. 33.

It has experimentally shown that, with the magnetic head 70, a large contact area with the magnetic tape 64 may be maintained in stability even under an adverse condition in which the tape tension as a resistive force exerted by the magnetic tape 64 is of a smaller value. These experimental results correspond to a graph of FIG. 35 showing the contact area in the tape tension direction of the magnetic tape 64 for the magnetic head 70 of the second embodiment and that of the conventional magnetic head. It is seen from FIG. 35 that, if the running speed of the magnetic tape 64 is 2 m/s, the contact area in the tape tension direction of the magnetic tape 64 is larger and more stable than that with the conventional magnetic head.

It has also been experimentally shown that, with the present magnetic head 70, as compared to the conventional magnetic head, the vibrations of the magnetic tape 64 is decreased to approximately one-third in terms of a ratio of the output voltage ratio as measured by an optical displacement meter.

Thus, with the magnetic head 70, the magnetic tape 64 is contacted reliably with the gap material g, as a tape tension of the running magnetic tape 64 is kept constant, for reliably recording or reading out data signals on the magnetic tape 64.

Figure 36:
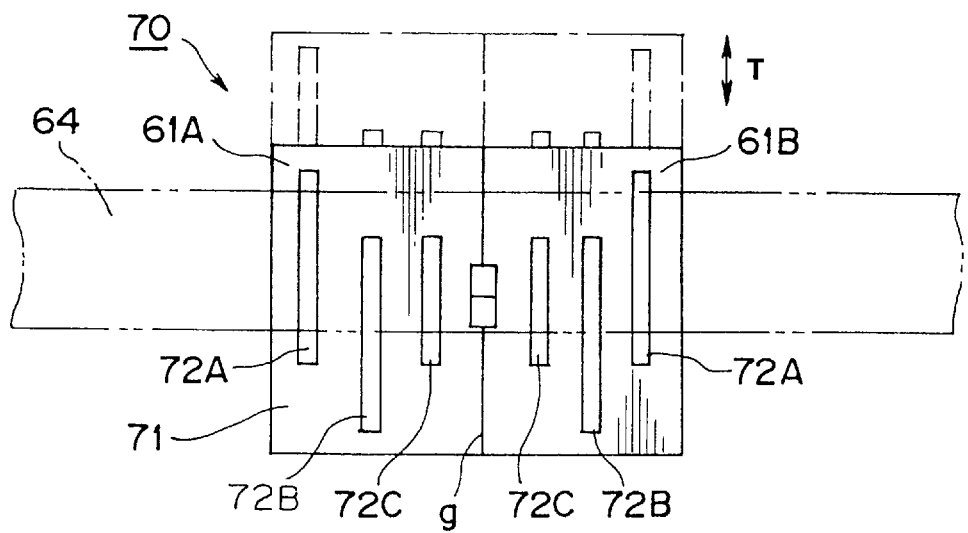
FIG. 36 is a front view showing the sliding state of the magnetic head of FIG. 33.

When the running direction of the magnetic tape 64 is switched from the forward direction to the reverse direction or vice versa, the magnetic tape 64 is slid along the width of the magnetic tape 64 as indicated by arrow T in FIG. 36 by rotation of the spindle rod 75 by the driving motor for selectively scanning the upper recording track portion and the lower recording track portion for recording or reading data signals by the gap material g. At this time, the magnetic head 70 damps the vibrations in the direction of tension and width and in the direction of tension of the magnetic tape 64, under the force of suction exerted by the magnetic tape suction grooves 72 on the magnetic tape 64, thus permitting the magnetic tape 64 to run in stable condition.

With the above-described first embodiment of the magnetic head 70, a plurality of the magnetic tape suction grooves 72 are formed in the tape contact surface 71 for sucking the running magnetic tape 64 by the suction grooves 72 for controlling the vibrations in the direction of tension and width and in the running direction of the magnetic tape 64. The result is that the running properties of the magnetic tape 64 may be improved for stabilizing the recording/ reproducing characteristics of the magnetic tape 64 for reliably prohibiting data errors from occurrence.

With the present magnetic head 70, in which the plural suction grooves 72 having different lengths along the height of the tape contact surface 71 are formed on the tape contact surface 71 in its entirety, the recording/reproducing characteristics of the totality of recording tracks of the magnetic tape 64 may be improved without regard to the relative position thereof with respect to the magnetic tape 64 for stabilizing recording/reproducing characteristics for reliably preventing data errors from occurrence.

Thus it is possible for the magnetic head 70 to run the magnetic tape 64 in stable condition and to use a higher recording frequency for the magnetic tape 64 for increasing the number of recording tracks and hence the recording capacity of the magnetic tape 64.

The present invention may be applied to a recording head for a tape cartridge having a magnetic tape of any one of a variety of tape widths, such as 4 mm, 8 mm, ¼", ¾" or 1", a tape cartridge for audio or a tape cartridge for a video tape recorder, in addition to the above-mentioned magnetic head.

Referring to FIGS. 37 to 65, preferred embodiments of the recording/reproducing apparatus according to the present invention will be explained in detail. A recording/reproducing apparatus according to a first embodiment includes a magnetic head 81 for recording or reading out data signals for a magnetic tape 88, and a pair of tape guide members 82A, 82B positioned on the same side as the magnetic head 81 with respect to the magnetic tape 88, as shown in FIGS. 37 to 40.

Figure 37:
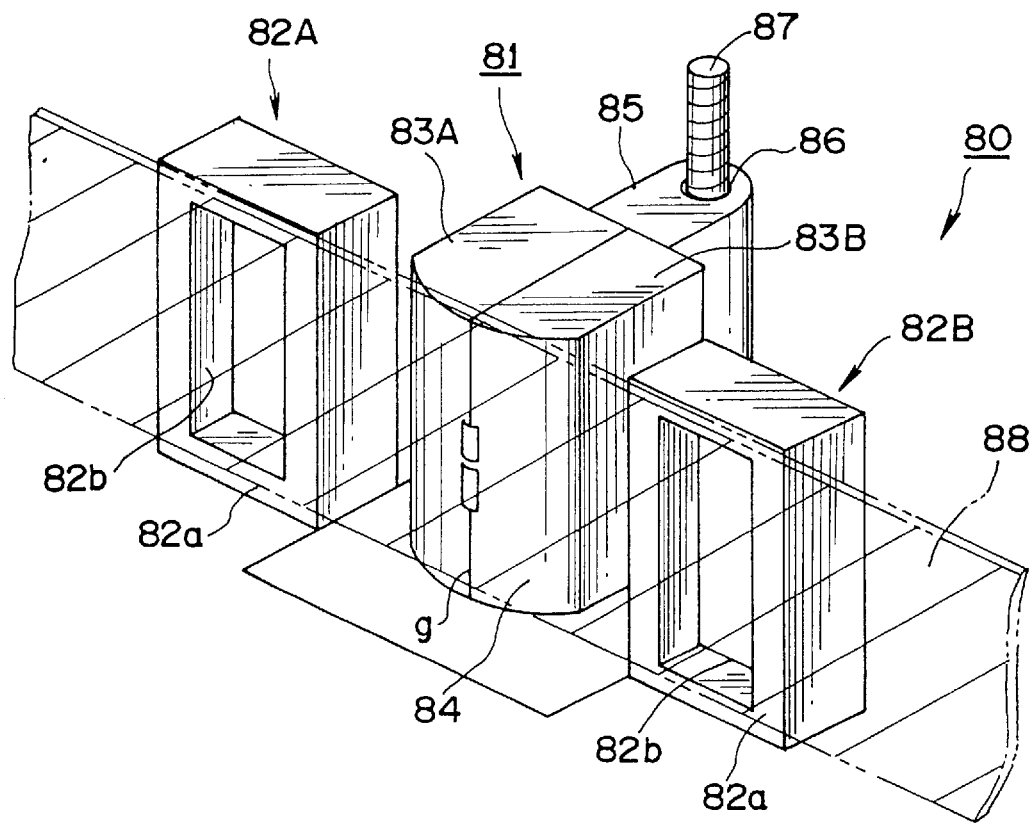
FIG. 37 is a schematic perspective view showing a recording/reproducing apparatus according to a first embodiment of the present invention.

The magnetic head 81 includes a pair of magnetic core halves 83A, 83B formed of, for example, sendust, permalloy, ferrite or amorphous, as shown in FIG. 37. The magnetic head 81 has a height larger than the width of the magnetic tape 88 and a size large enough to enter the recording/reproducing aperture of a data cartridge, not shown.

The magnetic core halves 83A, 83B of the magnetic head 81 are transversely symmetrical to each other with the abutting surfaces thereof as a boundary. The magnetic core halves 83A, 83B are abutted to each other for forming a closed magnetic path to form a magnetic core. The magnetic head 81 has a magnetic gap material g in the abutting surfaces of the magnetic core halves 83A, 83B. A gap spacer material in the form of a thin plate formed of a non-magnetic material, e.g., titanium or beryllium copper, may be interposed as the magnetic gap material g for increasing the strength of the magnetic field.

The magnetic head 81 has a curved contact surface 84 for contacting with the magnetic tape 88. The curved contact surface 62, curved in the running direction of the magnetic tape 64, has a surface roughness such that the maximum height of the protrusions from an imaginary centerline, on both sides of which the areas of the protrusions and recesses in the cross-sectional area, are equal to each other, is not less than 0.8 µm for preventing the curved contact surface from becoming affixed to the magnetic tape 64.

The magnetic head 81 is provided with a rod holder 85 on the back side of the magnetic tape contact surface 84. The rod holder 85 has a tapped hole 86 in which is screwed a spindle rod 87 secured to the distal end of a driving motor, not shown. Thus the magnetic head 81 is moved along the height by the rotational movement of the spindle rod 87 by the driving motor.

The tape sliding surfaces 82a, 82a are formed with tape suction grooves 82b, 82b. The tape suction grooves 82b, 82b are of a height smaller than the width of the magnetic tape 88 and a width smaller than the length of the tape 88 contacted with the tape slide surfaces 82a, 82a. For example, the tape suction grooved 82b, 82b are 4.0 mm in height, 2.0 mm in width and 2.0 mm in depth.

Figure 38:
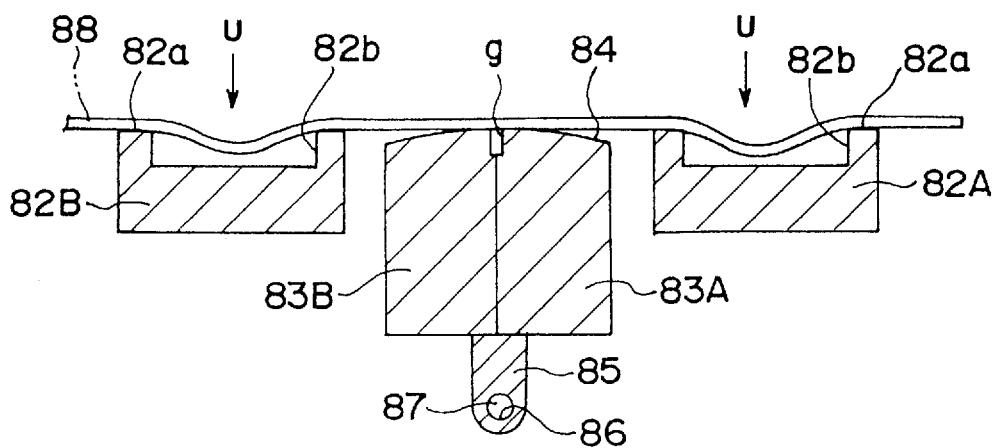
FIG. 38 is a schematic horizontal cross-sectional view for illustrating the state of the magnetic tape running along the magnetic head and the tape guide member in the recording/reproducing apparatus of FIG. 37.

In the above-described recording/reproducing apparatus 80, a data cartridge is loaded in the inside of the cartridge inserting aperture of a driving device, not shown. With the recording/reproducing apparatus 80, as shown in FIG. 38, the magnetic head 81 is moved forwards so that the tape contacting curved surface 84 is slightly contacted from outside with the magnetic tape 88. The tape guide members 82A, 82B are moved forwards so that the tape slide surfaces 82a, 82a are contacted from outside with the magnetic tape 88. At this time, the tape suction grooves 82b, 82b formed in the tape sliding surfaces of the tape guide members 82A, 82B are stopped by the magnetic tape 88.

If the magnetic tape is moved as it is kept in slight contact with the tape suction grooves 82b, 82b of the tape guide members 82A, 82B, there is produced a difference in atmospheric pressure between the inside and the outside of the magnetic tape 64, thus sucking the tape in a direction indicated by arrow U in FIG. 38.

Thus, by the force of suction exerted by the tape suction grooves 82b, 82b in the tape guide members 82A, 82B on the magnetic tape 88, the recording/reproducing apparatus 80 damps the vibrations of the magnetic tape 88 in the direction of tension and width and in the running direction of the magnetic tape 88 for allowing the magnetic tape 88 to run in stable condition. At this time, an air film layer is produced between the tape suction grooves 82b, 82b of the tape guide members 82A, 82B and the running magnetic tape 88, thus preventing friction from being produced.

It has experimentally shown that, with the recording/reproducing apparatus 80, a large contact area with the magnetic tape 88 may be maintained in stability even under an adverse condition in which the tape tension as a resistive force exerted by the magnetic tape 64 is of a smaller value.

Figure 39:
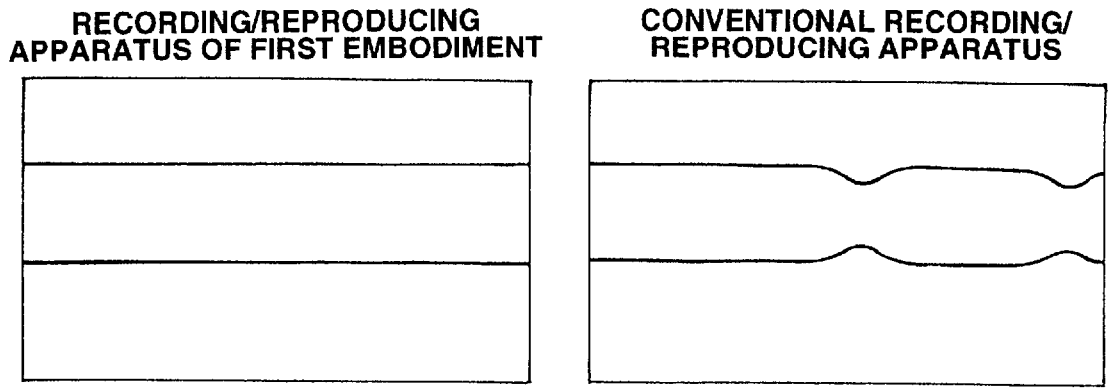
FIG. 39 is a graph for illustrating comparison of the contact area of the magnetic tape with respect to the magnetic head in the recording/reproducing apparatus of FIG. 37.

These experimental results correspond to a graph of FIG. 39 showing the contact area in the tape tension direction of the magnetic tape 88 for the recording/reproducing apparatus 80 of the first embodiment and that of the convectional magnetic head. It is seen from FIG. 39 that, if the running speed of the magnetic tape 88 is 2 m/s, the contact area in the tension direction of he magnetic tape 88 with the magnetic head 81 is larger and more stable with the recording/reproducing apparatus 80 than with the conventional recording/reproducing apparatus.

It has also been experimentally shown that, with the present recording/reproducing apparatus 80, as compared to the conventional recording/reproducing apparatus, the vibrations of the magnetic tape 64 are decreased to approximately one-third in terms of a ratio of the output voltage as measured by an optical displacement meter.

Thus, with the recording/reproducing apparatus 80, the magnetic tape 88 is contacted reliably with the gap material g, whilst a tape tension of the running magnetic tape 88 is kept constant by the tape tension guide members 82A, 82B, for reliably recording or reading out data signals on the magnetic tape 88 by the gap material g.

Figure 40:
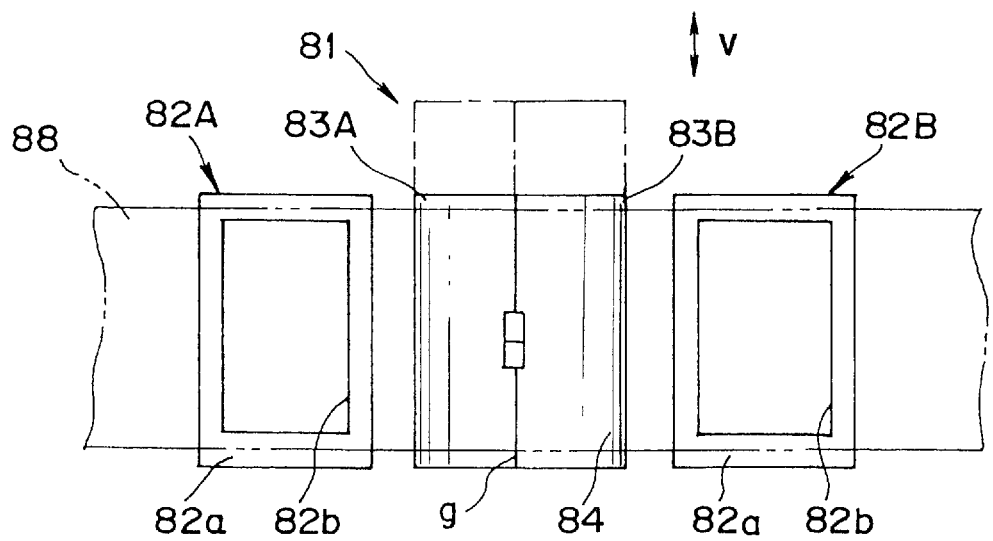
FIG. 40 is a front view showing the sliding state of the magnetic head in the recording/reproducing apparatus of FIG. 37.

When the running direction of the magnetic tape 88 is switched from the forward direction to the reverse direction or vice versa, the magnetic tape 88 is slid along the width of the magnetic tape 88 as indicated by arrow V in FIG. 40 by rotation of the spindle rod 87 by the driving motor for selectively scanning the upper recording track portion and the lower recording track portion for recording or reading data signals by the gap material g. At this time, the recording/reproducing apparatus 80 damps the vibrations in the direction of tension and width and in the direction of tension of the magnetic tape 88, under the force of suction exerted by the tape suction grooves 82b, 82b of the tape guide members 82A, 82B on the magnetic tape 64, thus permitting the magnetic tape 64 to run in stable condition.

With the above-described first embodiment of the recording/reproducing apparatus 80, the tape guide members 82A, 82B formed with the tape suction grooves 82b, 82b are provided on both sides of the magnetic head 81 for sucking the running magnetic tape 88 by the suction grooves 82b, 82b for controlling the vibrations in the direction of tension and width and in the running direction of the magnetic tape 88. The result is that the running performance of the magnetic tape 88 may be improved for stabilizing the recording/reproducing characteristics of the magnetic tape 88 for reliably prohibiting data errors from occurrence.

With the present recording/reproducing apparatus 80, in which the magnetic tape guide members 82A, 82B are mounted at a distance from the magnetic head 81, recording/reproducing characteristics of the totality of recording tracks of the magnetic tape 88 may be improved without regard to the relative position of the magnetic head 81 with respect to the magnetic tape 88 for stabilizing the recording/reproducing characteristics for reliably preventing data errors from occurrence.

Thus it is possible for the recording/reproducing apparatus 80 to run the magnetic tape 88 in stable condition and to use a higher recording frequency for the magnetic tape 64 for increasing the number of recording tracks and hence the recording capacity of the magnetic tape 88.

With the recording/reproducing apparatus 80, it is possible to deal with a variety of tape cartridges for recording/reproduction, such as tape cartridges having a magnetic tape of any one of a variety of tape widths, such as 4 mm, 8 mm, ¼", ¾" or 1", a taper cartridge for audio or a tape cartridge for a video tape recorder, while maintaining interchangeability. The recording/reproducing apparatus can be produced easily to reduce production costs.

With the first embodiment of the recording/reproducing apparatus 80, a larger number of tape suction grooves, formed as elongated grooves with different lengths along the width of the magnetic tape 88, may be formed in the magnetic tape guide members 82A, 82B in their entirety.

With the first embodiment of the recording/reproducing apparatus 80, the tape guide members 82A. 82B are arranged on both lateral sides of the magnetic head 81. However, it is also possible to provide the sole tape guide member 82A and a sole tape guide pin on one and the other sides of the magnetic head 81, respectively.

Figure 41:
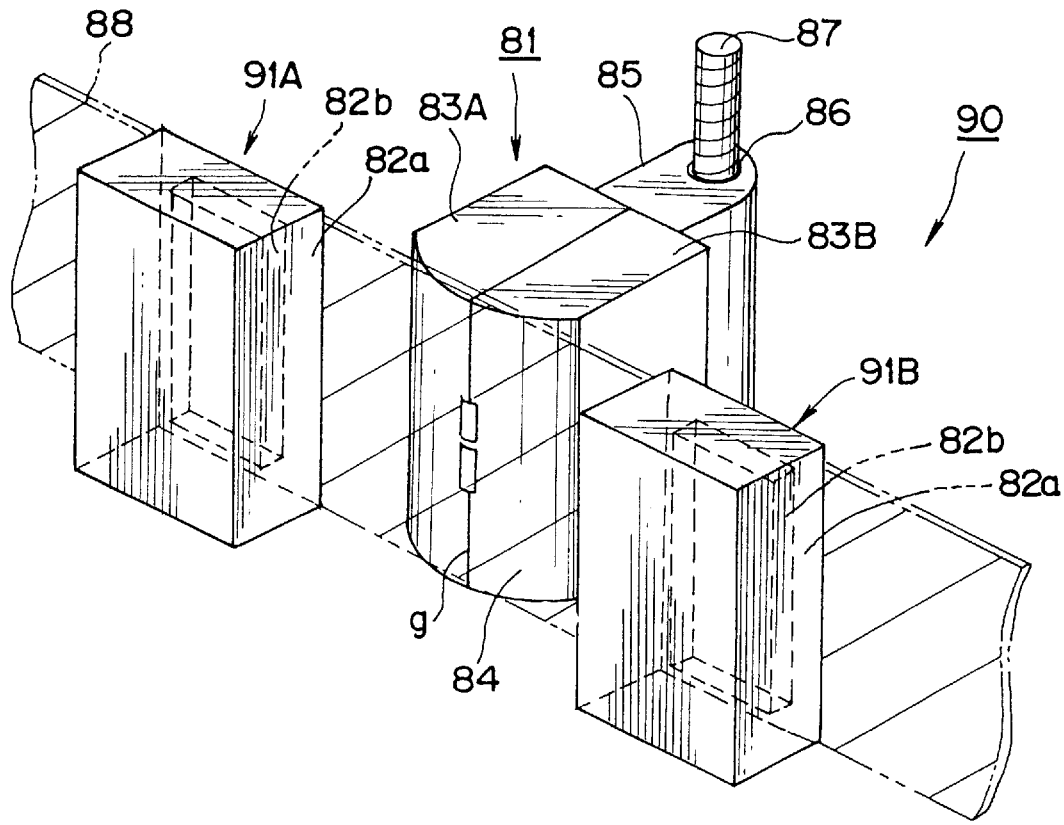
FIG. 41 is a schematic perspective view showing a recording/reproducing apparatus according to a second embodiment of the present invention.

A recording/reproducing apparatus 90 according to a second embodiment has a basic structure similar to that of the recording/reproducing apparatus 80 of the first embodiment, as shown in FIG. 41. In the following description, the parts or components similar to those of the recording/reproducing apparatus 80 of the above-described first embodiment are denoted by the same reference numerals and the detailed description is not made for clarity.

The recording/reproducing apparatus 90 has a pair of tape guide members 91A, 91B adapted for being moved vertically for being intruded into or receded from the interior of the data cartridge, independently of the magnetic head 81 moved in the fore-and-aft direction, as shown in FIG. 41. The tape guide members 91A, 91B are arranged so that, after intrusion into the inside of the data cartridge, the tape guide members 91A, 91B are positioned in a second area lying on the opposite side of the magnetic tape with respect to a first area in which is provided the magnetic head 81.

With the above-described recording/reproducing apparatus 90, the magnetic head 81 is moved forwards so that its tape-contacting curved surface 84 is slightly contacted from outside with the magnetic tape 88, as shown in FIG. 41. With the recording/reproducing apparatus 90, the tape guide members 91A, 91B are moved upwards so as to be intruded into the inside of the data cartridge via its aperture. At this time, the tape suction groves 82a, 82a formed in the tape sliding surfaces 82a, 82b are contacted with the magnetic tape 88 from the inner side of the data cartridge. At this time, the magnetic tape suction grooves 82b, 82b formed in the tape sliding surfaces 82a, 82a of the tape guide members 91A, 91B are closed by the magnetic tape 88.

Figure 42:
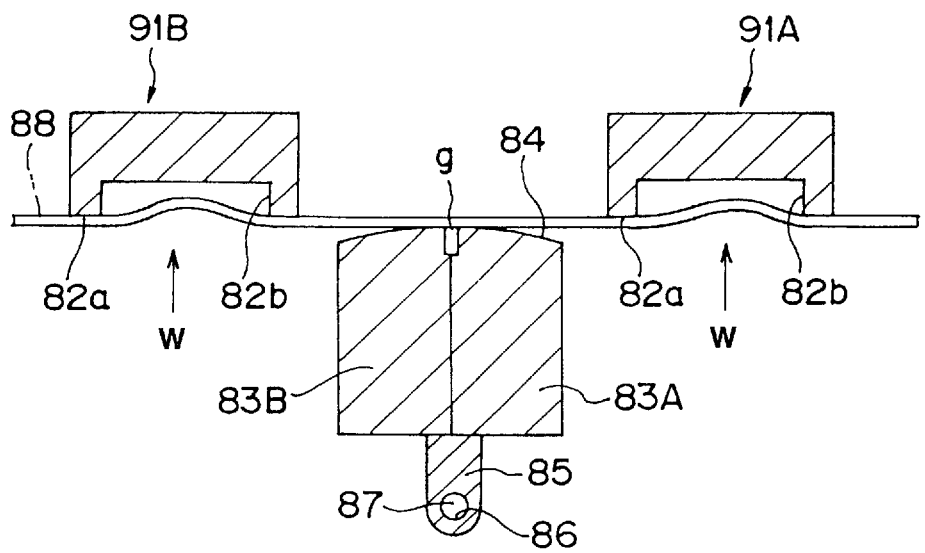
FIG. 42 is a schematic horizontal cross-sectional view for illustrating the state of the magnetic tape running along the magnetic head and the tape guide member in the recording/reproducing apparatus of FIG. 41.

When the magnetic tape 88 is run with a slight contact with the tape guide members 91A, 91B, there is produced a difference in atmospheric pressure across the magnetic tape 88 due to the tape suction grooves 82b, 82b in the tape guide members 91A, 91B, thus the tape being sucked in a direction indicated by arrow W in FIG. 42.

Thus, by the force of suction exerted by the tape suction grooves 82b, 82b in the tape guide members 91A, 91B on the magnetic tape 88, the recording/reproducing apparatus 90 damps the vibrations of the magnetic tape 88 in the direction of tension and width and in the running direction of the magnetic tape 88 for allowing the magnetic tape 88 to run in stable condition. At this time, an air film layer is produced between the tape suction grooves 82b, 82b of the tape guide members 91A, 91B and the running magnetic tape 88, thus preventing friction from being produced.

It has been experimentally shown that, with the recording/reproducing apparatus 90, a large contact area with the magnetic tape 88 may be maintained in stability even under an adverse condition in which the thrusting amount of the magnetic head 81 against the magnetic tape 64 is of a smaller value.

These experimental results may be obtained by comparing the amplitudes of the magnetic tape 88 for the recording/reproducing apparatus 90 of the second embodiment and that of the convectional recording/reproducing apparatus. It may be shown that, with the recording/reproducing apparatus 90 of the second embodiment, the amplitude of the magnetic tape 88 can be made significantly smaller than that with the conventional recording/reproducing apparatus even if the amount of intrusion α of the magnetic head 81 relative to the magnetic tape 88 is within a range from 0.0 to 3.0 mm.

It has also been experimentally shown that, with the recording/reproducing apparatus 90, a large contact area of the magnetic tape 88 with the magnetic head 81 may be maintained in stability even under an adverse condition in which the thrusting amount α of the magnetic head 81 against the magnetic tape 88 is of a smaller value.

The above experimental results may be obtained by comparing the contact areas in the tension direction of the magnetic tape 88 for the recording/reproducing apparatus 90 of the second embodiment and that of the convectional recording/reproducing apparatus. It has been experimentally shown that, with the recording/reproducing apparatus 90, a large contact area of the magnetic tape 88 with the magnetic head 81 may be maintained in stability in case the thrusting amount α of the magnetic head 81 against the magnetic tape 88 is 2.0 mm.

Therefore, with the recording/reproducing apparatus 90 of the second embodiment, the magnetic head 81 is positively contacted with the magnetic tape 88 for controlling vibrations of the magnetic tape 88 even if the amount of intrusion α of the magnetic head 81 relative to the magnetic tape 88 is in a range from 0.0 to 5.0 mm.

Figure 46:
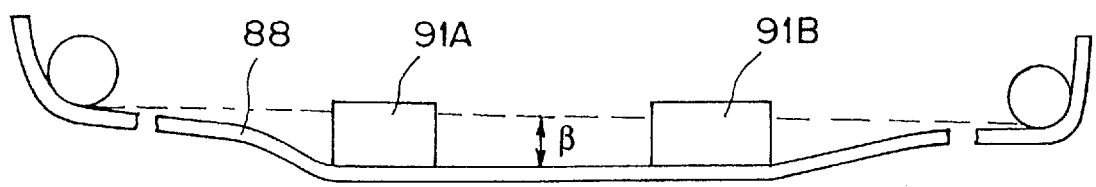
FIG. 46 is a schematic view for illustrating the amount of thrusting of the tape guide member with respect to the magnetic tape.

Also, with the recording/reproducing apparatus 90, it has been shown from the first and second experimental results that, as shown in FIG. 46, the magnetic tape 88 can be run under the state of damped oscillations of the magnetic tape 88 even under an adverse condition of a smaller value β of the thrusting amount β of the tape guide members 91A, 91B against the magnetic tape 88.

Figure 47:
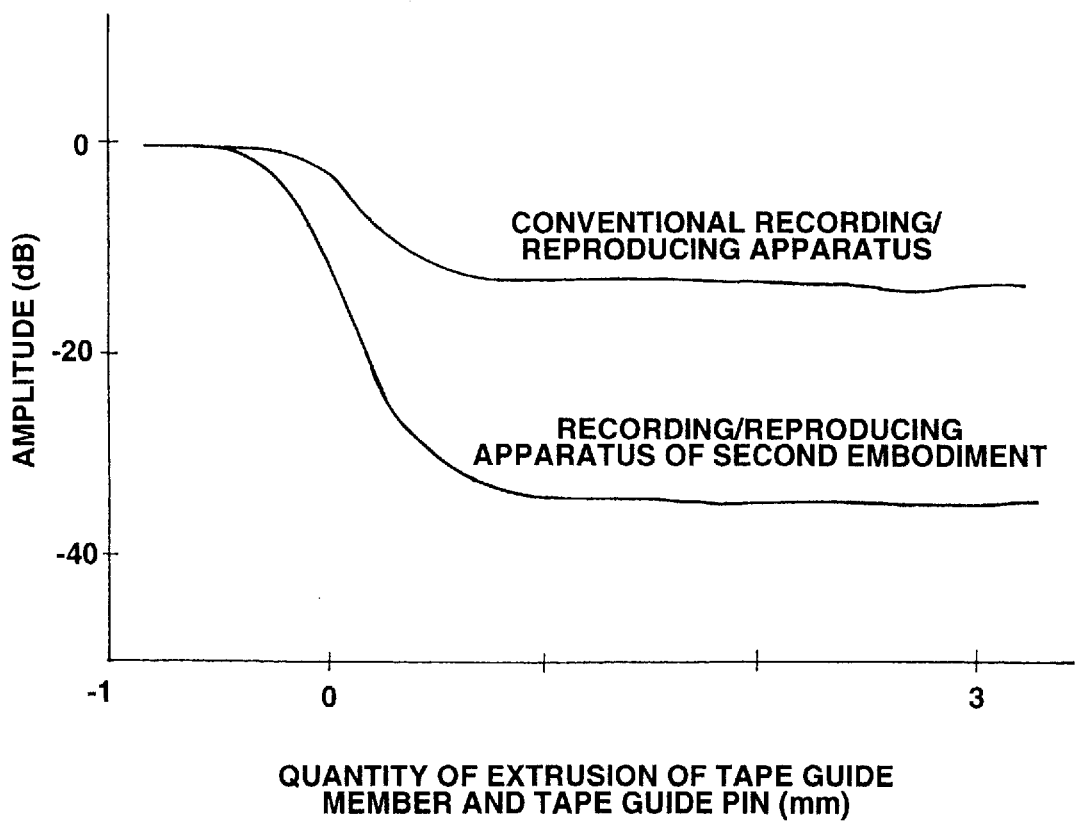
FIG. 47 is a graph for comparative illustration of the amplitude of the magnetic tape in the direction of tension in the recording/reproducing apparatus of FIG. 41.

The first experimental results may be obtained by comparing the amplitudes in the tape tensioning direction of the magnetic tapes 88 of the recording/reproducing apparatus 90 of the second embodiment to those of the conventional apparatus, as shown in FIG. 47. In the recording/reproducing apparatus 90 of the second embodiment, the amplitude damping effect for the magnetic tape 88 are produced for the thrusting amount β of the tape guide members 91A, 91B against the magnetic tape 88 equal to −0.1 mm, with the amplitude damping effect for the magnetic tape 88 being increased rapidly on contact with the magnetic tape 88 of the tape guide members 91A, 91B. Thus it can be confirmed that the amplitude of the magnetic tape 88 is smaller by approximately −20 dB than that with the conventional recording/reproducing apparatus.

Figure 48:
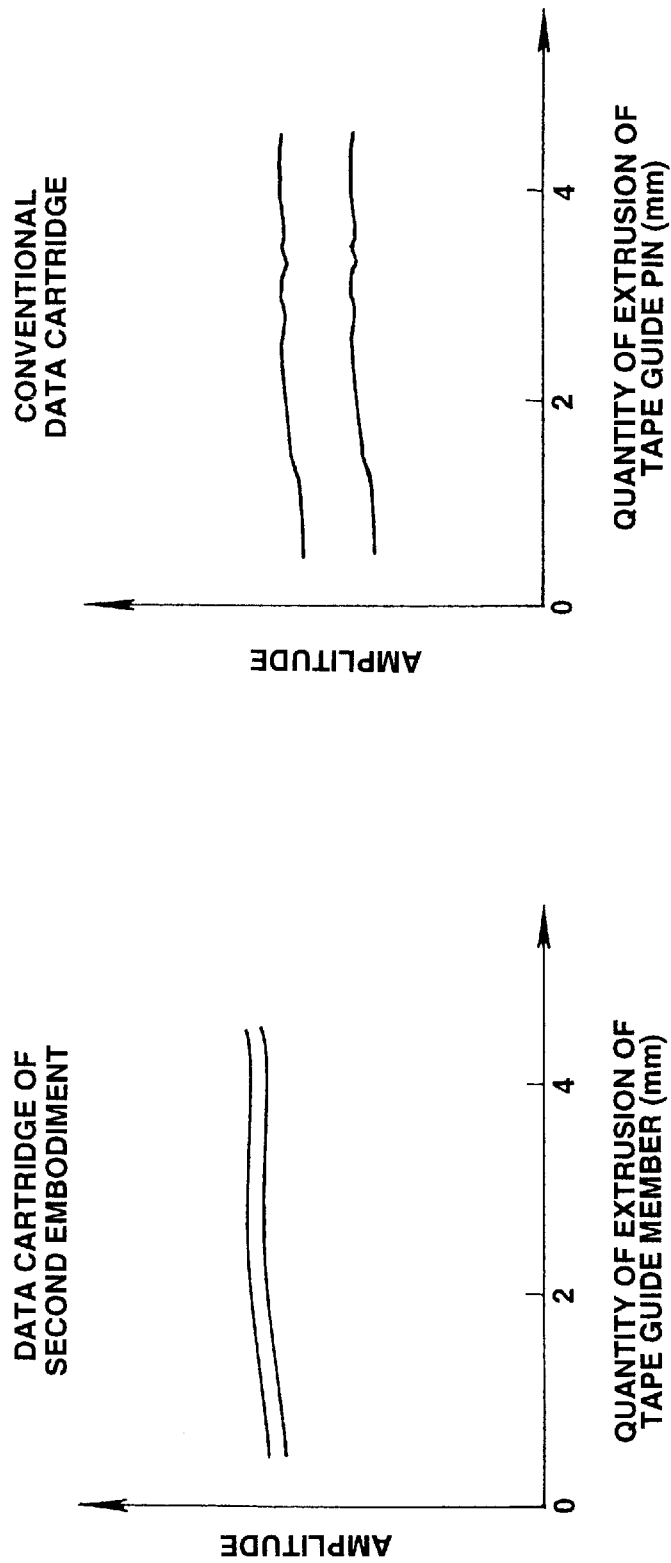
FIG. 48 is a graph for comparative illustration of the amplitude along the width of the magnetic tape in the recording/reproducing apparatus of FIG. 41.

The second experimental results can be obtained by comparing the amplitude in the direction of width of the magnetic tape 88 of the second embodiment to that of the conventional data cartridge as shown in FIG. 48. It may be confirmed that, with the recording/reproducing apparatus 90 of the second embodiment, the amplitude of the magnetic tape 88 is significantly smaller than that of the conventional data cartridge even if the amount of extrusion β of the tape guide members 91A, 91B with respect to the magnetic tape 88 is within a range of 0.0 to 4.0 mm.

It has also been shown that, with the data cartridge 90, a larger value of the contact area of the magnetic tape 88 with the magnetic head 81 may be maintained in stability even under an adverse condition of a smaller thrusting amount β of the tape guide members 91A, 91B against the magnetic tape 88.

Figure 49:
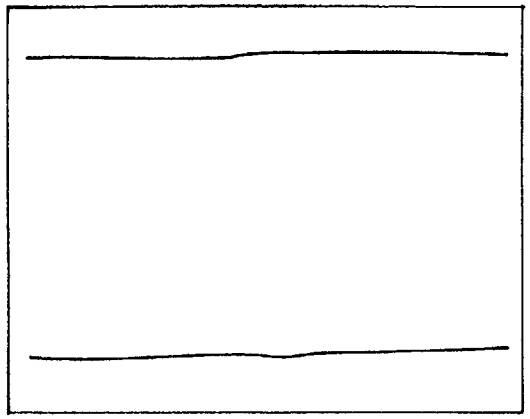
FIG. 49 is a graph for illustrating comparison of the contact area of the magnetic tape with respect to the magnetic head in the recording/reproducing apparatus of FIG. 41.
Figure 49:
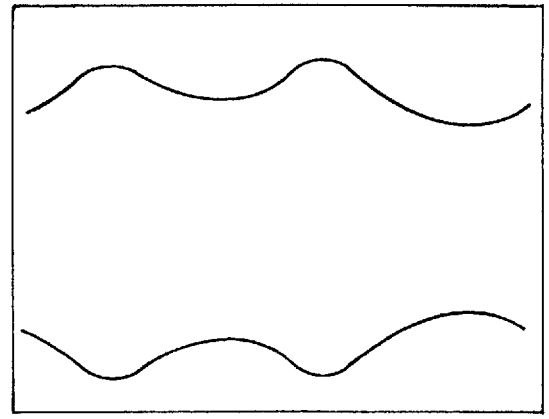

These experimental results may be obtained by comparing the contact area in the tape tension direction of the magnetic tape 88 with the magnetic head 81 of the recording/reproducing apparatus 90 of the second embodiment to that of the conventional recording/reproducing apparatus. as shown in FIG. 49. It may be confirmed that, with the recording/reproducing apparatus of the second embodiment, a larger value of the contact area with the magnetic tape 88 of the tape guide members 91A, 91B than that with the conventional recording/reproducing apparatus may be obtained in stability in case the thrusting amount β of the tape guide members 42A, 42B against the magnetic tape 10 is 1.0 mm.

Thus, with the recording/reproducing apparatus of the second embodiment, the magnetic head 33 may be reliably contacted with the magnetic head 81 even if the amount of extrusion β of the tape guide members 91A, 91B with respect to the magnetic tape 88 is in a range from −0.1 to 5.0 mm.

With the recording/reproducing apparatus 90, the magnetic tape 88 is positively contacted with the gap material g of the magnetic head 81 under a condition in which the tape tension of the running magnetic tape 88 is kept constant by the tape guide members 91A, 91B, so that data signal are reliably recorded or read out on the magnetic tape 88 by the gap material g.

Figure 50:
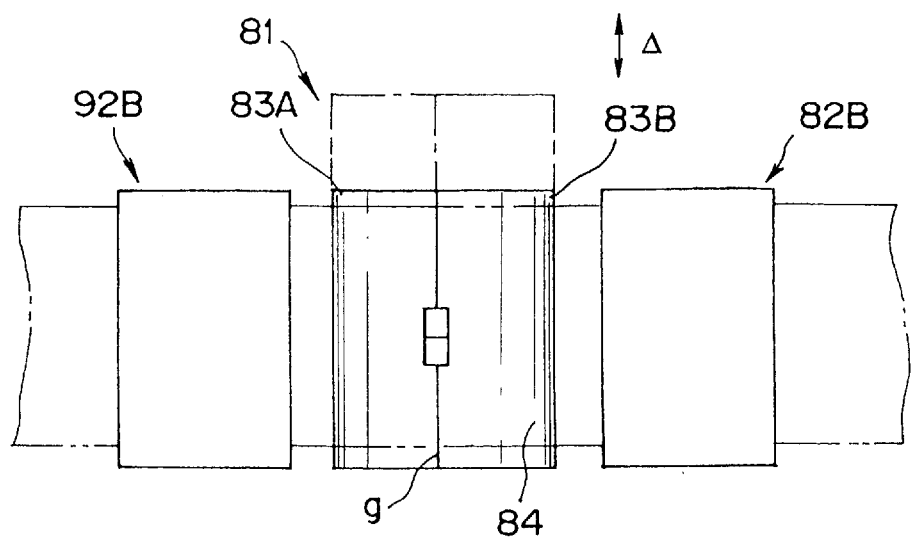
FIG. 50 is a front view showing the sliding state of the magnetic head in the recording/reproducing apparatus of FIG. 41.

As the running direction of the magnetic tape 88 is switched from the forward direction to the reverse direction or vice versa, the magnetic head 81 of the recording/reproducing apparatus 90 is slid by the rotational movement of the spindle rod 87 by the driving motor in the direction of width of the magnetic tape 88 as indicated by arrow A on FIG. 50. The magnetic head 81 selectively scans the upper recording track portion and the lower recording track portion for recording or reading data signals by the gap material g. At this time, the recording/reproducing apparatus 90 damps the vibrations in the direction of tension and width and in the direction of tension of the magnetic tape 88, under the force of suction exerted by the magnetic tape suction grooves 82b, 82b on the magnetic tape 88, thus permitting the magnetic tape 88 to run in stable condition.

With the above-described second embodiment of the recording/reproducing apparatus 90, a large number of the magnetic tape suction grooves 82b, 82b are formed in the tape guide members 91A, 91B for sucking the running magnetic tape 64 by the tape suction grooves 82b, 82b for controlling the vibrations in the direction of tension and width and in the running direction of the magnetic tape 88. The result is that the running properties of the magnetic tape 88 may be improved for stabilizing the recording/reproducing characteristics of the magnetic tape 88 for reliably prohibiting data errors from occurrence.

With the recording/reproducing apparatus 90, in which the tape guide members 91A, 91B are provided on the opposite side of the magnetic head 81 with respect to the magnetic tape 88, the tape tension exerted by the magnetic tape 88 on the magnetic head 81 is increased thus assuring positive contact of the magnetic head with the magnetic tape for preventing data errors from occurrence.

Thus it is possible for the recording/reproducing apparatus 90 to run the magnetic tape 88 in stable condition and to use a higher recording frequency for the magnetic tape 88 for increasing the number of recording tracks and hence the recording capacity of the magnetic tape 88.

Figure 51:
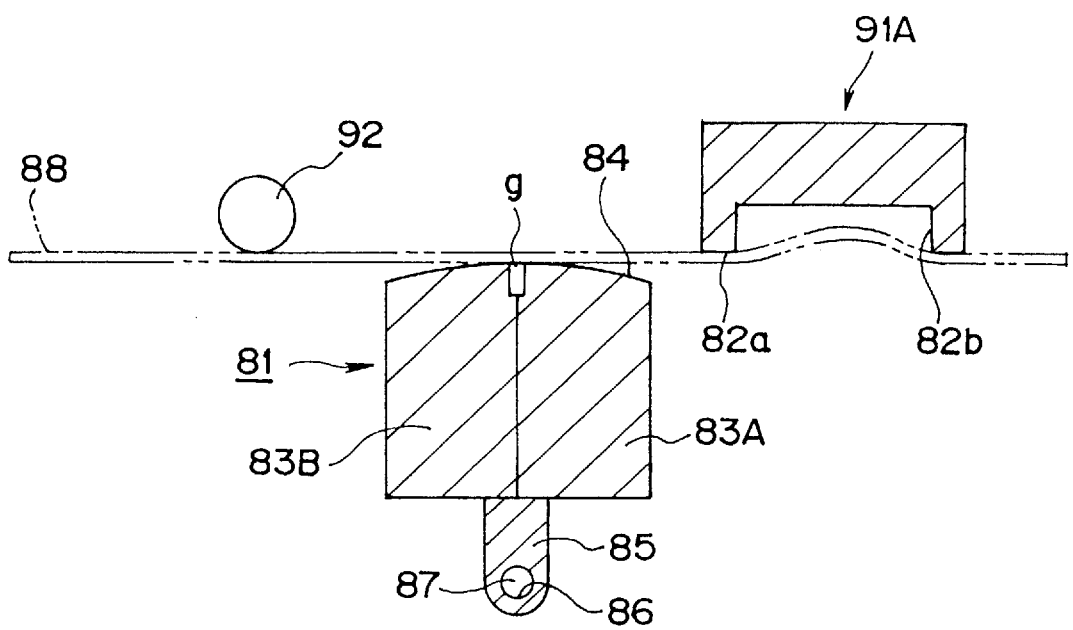
FIG. 51 is a schematic plan view showing a modification of the recording/reproducing apparatus of FIG. 41.
Figure 52:
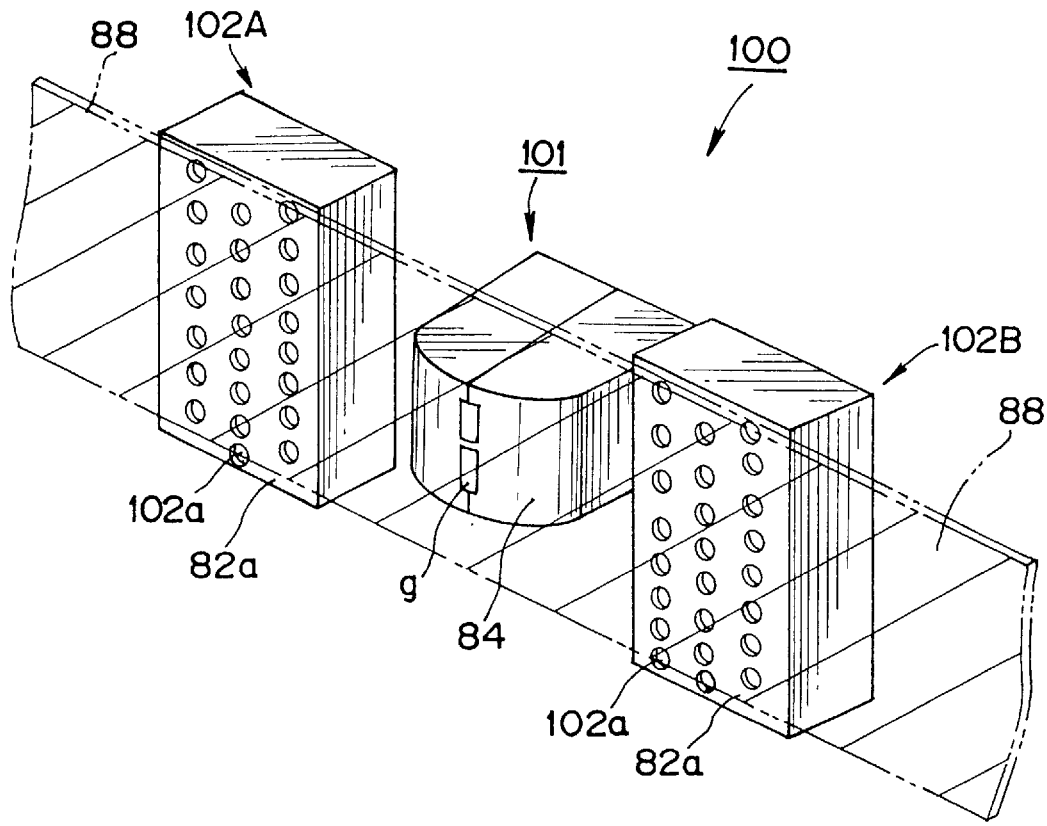
FIG. 52 is a schematic perspective view showing a recording/reproducing apparatus according to a third embodiment of the present invention.

Although the tape guide members 91A, 91b are arranged in the second embodiment of the recording/reproducing apparatus 90, as shown in FIG. 51, it is also possible to provide the tape guide member 91A and the sole tape guide pin 92 on one and on the other side, respectively.

A recording/reproducing apparatus 100 according to a third embodiment has a basic structure similar to that of the recording/reproducing apparatus 80 of the first embodiment, as shown in FIGS. 52 to 55. In the following description, the parts or components similar to those of the recording/reproducing apparatus 80 of the above-described first embodiment are denoted by the same reference numerals and the detailed description is not made for clarity.

Figure 43:
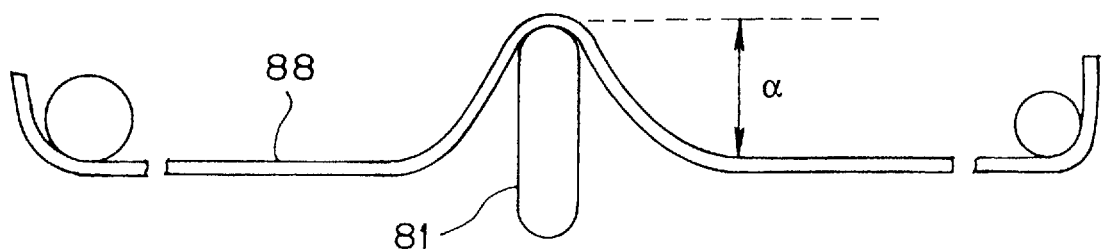
FIG. 43 is a schematic view for illustrating the amount of thrusting of the magnetic head with respect to the magnetic tape.
Figure 44:
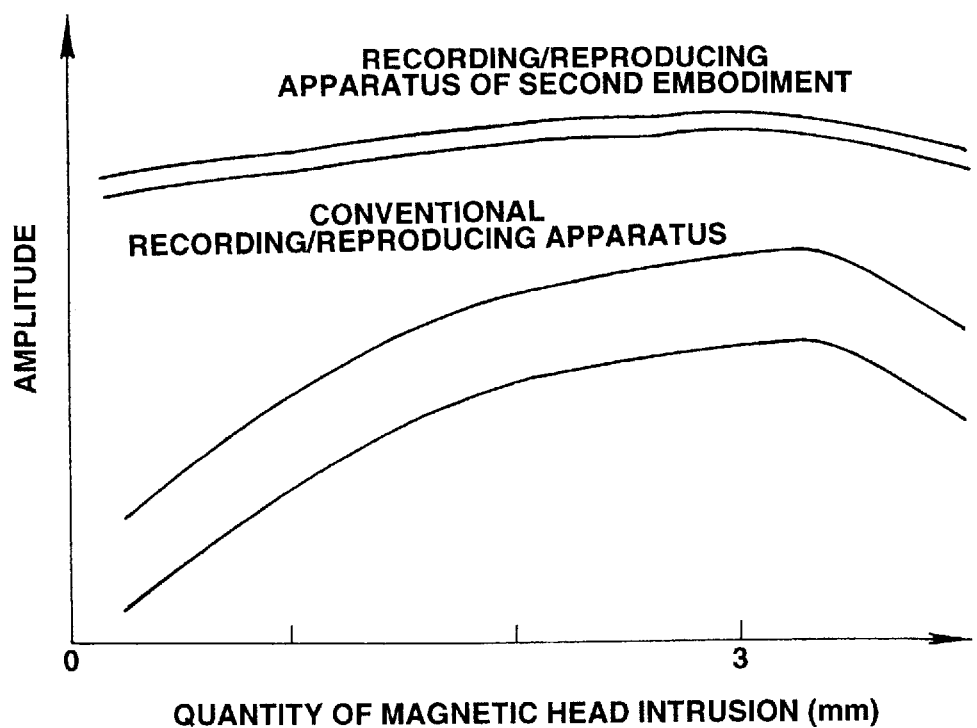
FIG. 44 is a graph for comparative illustration of the amplitude of the magnetic tape in the recording/reproducing apparatus of FIG. 41.
Figure 45:
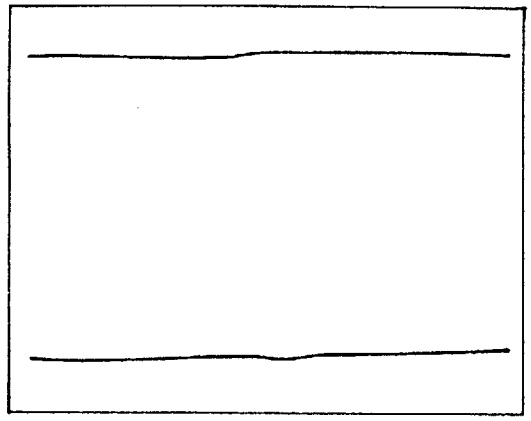
FIG. 45 is a graph for comparative illustration of the contact area of the magnetic tape with respect to the magnetic head in the recording/reproducing apparatus of FIG. 37.
Figure 45:
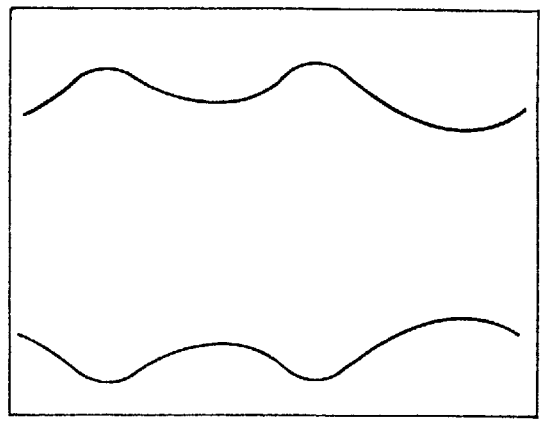

With the third embodiment of the recording/reproducing apparatus 100, a magnetic head 101 is sized to be large enough to be admitted into a recording/reproducing aperture of a data cartridge, not shown, and is of a height larger than the width of the magnetic tape 88, as shown in FIG. 43.

Numerous tape suction recesses 102a, 102a are formed in the entire tape slide surfaces 82a, 82a of the tape guide members 102A, 102B in the direction of width and in the running direction of the magnetic tape 88, as shown in FIG. 42. These magnetic tape suction recesses 102a, 102a are formed as substantially semi-spherical-shaped recesses.

Figure 53:
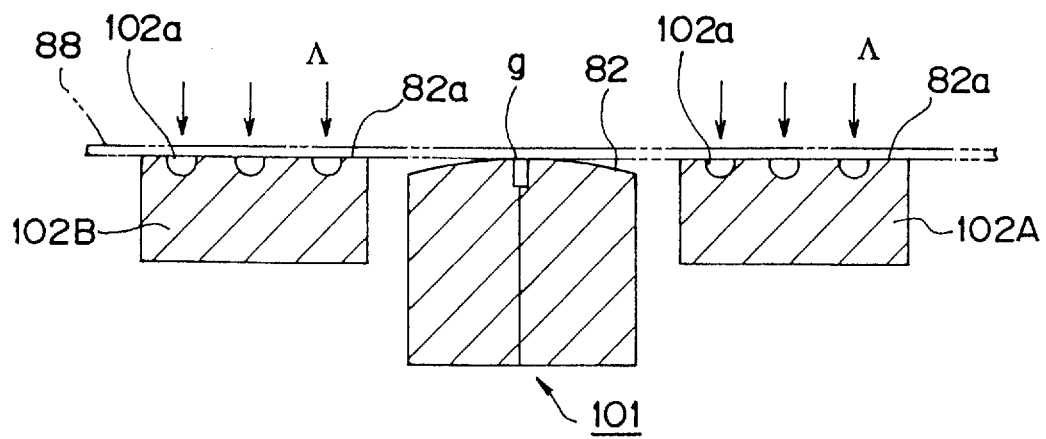
FIG. 53 is a schematic horizontal cross-sectional view for illustrating the state of the magnetic tape running along the magnetic head and the tape guide member in the recording/ reproducing apparatus of FIG. 52.

When the magnetic tape 88 is run with a slight contact with the recording/reproducing apparatus 100, there is produced a difference in atmospheric pressure across the magnetic tape 88 due to the tape suction recesses 102b, 102b in the tape guide members 102A, 102B, thus the tape being sucked in a direction indicated by arrow A in FIG. 53.

Thus, by the force of suction exerted by the tape suction recesses 102b, 102b in the tape guide members 102A, 102B on the magnetic tape 88, the recording/reproducing apparatus 100 damps the vibrations of the magnetic tape 88 in the direction of tension and width and in the running direction of the magnetic tape 88 for allowing the magnetic tape 88 to run in stable condition. At this time, an air film layer is produced between the tape slide surfaces 82a, 82a of the tape guide members 102A, 102B and the running magnetic tape 88, thus preventing friction from being produced.

With the recording/reproducing apparatus 90, the magnetic tape 88 is positively contacted with the gap material g of the magnetic head 81 under a condition in which the tape tension of the running magnetic tape 88 is kept constant by the tape guide members 102A, 102B, so that data signals are reliably recorded or read out on the magnetic tape 88 by the gap material g.

Figure 54:
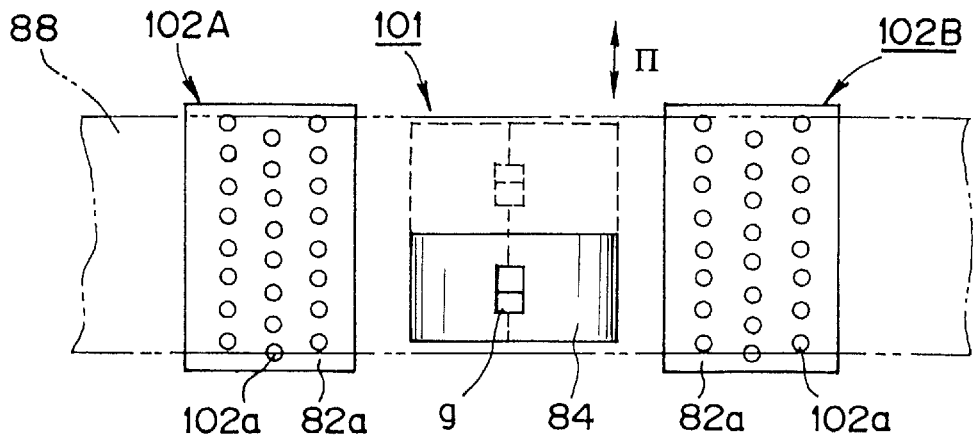
FIG. 54 is a front view showing the sliding state of the magnetic head in the recording/reproducing apparatus of FIG. 52.

As the running direction of the magnetic tape 88 in the recording/reproducing apparatus 100 is switched from the forward direction to the reverse direction or vice versa, the magnetic head 101 of the recording/reproducing apparatus 100 is slid in the direction of width of the magnetic tape 88 as indicated by arrow on FIG. 54. The magnetic head 81 selectively scans the upper recording track portion and the lower recording track portion of the magnetic head 88 for recording or reading data signals by the gap material g.

It has been shown experimentally that, even if the magnetic head 101 is slid along the width of the magnetic tape 88, the contact area of the magnetic head 101 with the magnetic tape 88 can be maintained in a stable condition.

Figure 55:
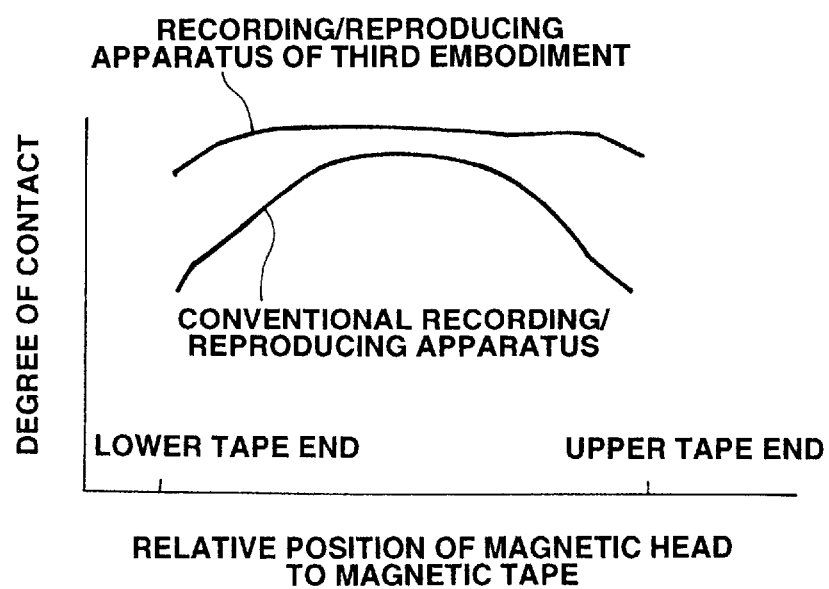
FIG. 55 is a graph for comparative illustration of the contact area of the magnetic tape with the magnetic head as a function of the tape position.

These experimental results are obtained from a graph of FIG. 55 showing the contact areas in the tension direction of the magnetic tape 88 in the present third embodiment of the recording/reproducing apparatus 100 and the conventional recording/reproducing apparatus. It is seen from FIG. 55 that, with the present third embodiment of the recording/reproducing apparatus 100, the contact area of the magnetic tape 88 with the magnetic head 101 in the tension direction can be obtained along the entire vertical extent of the magnetic tape 88 in a more stable state than with the conventional recording/reproducing apparatus.

Thus, by the force of suction exerted by the tape suction recesses 102b, 102b in the tape guide members 102A, 102B on the magnetic tape 88, the recording/reproducing apparatus 100 damps the vibrations of the magnetic tape 88 in the direction of tension and width and in the running direction of the magnetic tape 88 for allowing the magnetic tape 88 to run in stable condition.

With the above-described third embodiment of the recording/reproducing apparatus 100, the tape guide members 102A, 102B formed with tape suction recesses 102a, 102a are provided on both lateral sides of the magnetic head 101 for sucking the running magnetic tape 88 by the suction recesses 102a, 102a for controlling the vibrations in the direction of tension and width and in the running direction of the magnetic tape 88. The result is that the running performance of the magnetic tape 88 may be improved for stabilizing the recording/reproducing characteristics of the magnetic tape 88 for reliably prohibiting data errors from occurrence.

Also, with the present recording/reproducing apparatus 100, in which the tape guide members 102A, 102B are mounted at a distance from the magnetic head 101, recording/reproducing characteristics can be stabilized over the entire recording tracks of the magnetic tape 88, irrespective of the relative position of the magnetic head 101 with respect to the recording tracks of the magnetic tape 88, thus positively preventing data errors from occurrence.

Moreover, with the present recording/reproducing apparatus 100, in which the magnetic head 101 is of a height smaller than the width of the magnetic tape 88, space loss due to air film entrainment between the magnetic head 101 and the magnetic tape 88 may be prohibited, while the magnetic head 101 may be reduced in weight. Thus, with the recording/reproducing apparatus, the magnetic head 101 may be slid smoothly relative to the magnetic tape 88.

Thus it is possible for the recording/reproducing apparatus 100 to run the magnetic tape 88 in stable condition and to use a higher recording frequency for the magnetic tape 88 for increasing the number of recording tracks and hence the recording capacity of the magnetic tape 88.

Figure 56:
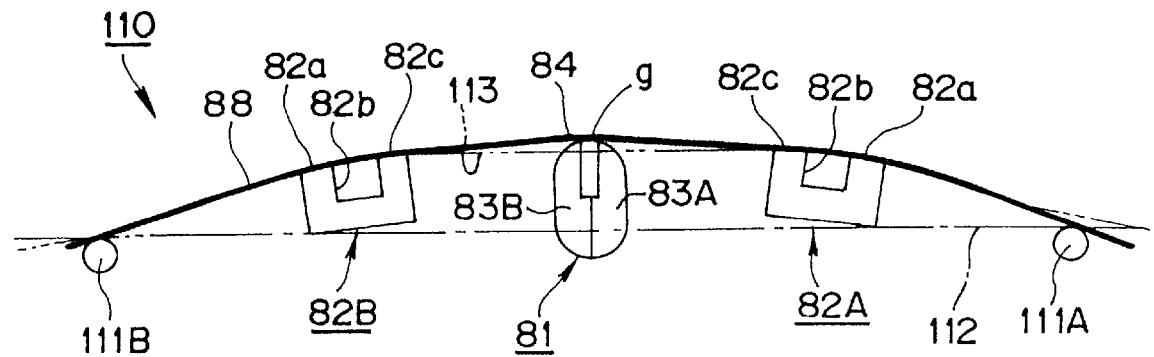
FIG. 56 is a schematic view showing a recording/ reproducing apparatus according to a fourth embodiment of the present invention.
Figure 57:
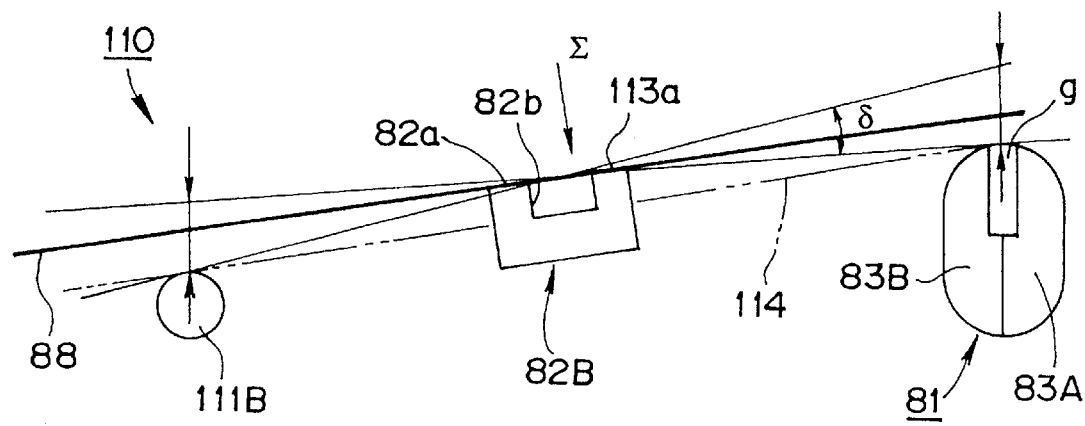
FIG. 57 is a schematic enlarged view of the recording/ reproducing apparatus shown in FIG. 56.

A recording/reproducing apparatus 110 according to a fourth embodiment has a basic structure similar to that of the recording/reproducing apparatus 80 of the first embodiment, as shown in FIGS. 56 and 57. In the following description, the parts or components similar to those of the recording/reproducing apparatus 80 of the above-described first embodiment are denoted by the same reference numerals and the detailed description is not made for clarity.

In the fourth embodiment of the recording/reproducing apparatus 110, a pair of tape guide pins 111A, 111B are set upright at a distance from the magnetic head 81, as shown in FIG. 56. The tape guide pins 111A, 111B are positioned so that the tape-contacting curved surface 84 of the magnetic head 81 is disposed closer to the tape cartridge than a first straight line interconnecting the tape guide pins 111A, 111B.

The recording/reproducing apparatus 110 has a pair of tape guide members 82A, 82B between the magnetic head 81 and a pair of the tape guide pins 111A, 111B. These tape guide members 82A, 82B are positioned so that the head-contacting curved surface 84 of the magnetic head 81 is located closer to the tape cartridge than a second straight line 113 interconnecting distal ends 82c, 82c of the magnetic head 81.

The tape guide members 82A, 82B are arranged so that, when the magnetic head 81 is thrust against the magnetic tape 88, the tape suction grooves 82b, 82b formed in the tape slide surfaces 82a, 82a are closed by the magnetic tape 88, as shown in FIG. 57. That is, the tape guide members 82A, 82B are arranged so as to be positioned closer to the tape cartridge than a straight line 114 interconnecting the curved tape sliding surface 84 of the magnetic head 81 thrust against the magnetic tape 88 and the tape sliding surfaces 82a, 82a of the tape guide pins 82A, 82B. The tape guide members 82A, 82B are arranged so that the tape slide surfaces 82a, 82a thereof run parallel to the third straight line 114. The tape guide members 82A, 82B may be oriented so that the angle of inclination is within a range of an angle δ, as shown in FIG. 57.

With the above-described recording/reproducing apparatus 110, the tape suction grooves 82b, 82b formed in the tape slide surfaces 82a, 82a of the tape guide members 82A, 82B are positively closed by the magnetic tape 88.

When the magnetic tape 88 is run with a slight contact with the tape suction grooves 82b, 83b in the tape guide members 82A, 82B, there is produced a difference in atmospheric pressure between the inside and the outside of the magnetic tape 88, thus the magnetic tape 88 being sucked in a direction indicated by arrow π in FIG. 57.

Thus, by the force of suction exerted by the tape suction recesses 102b, 102b in the tape guide members 102A, 102B on the magnetic tape 88, the recording/reproducing apparatus 100 damps the vibrations of the magnetic tape 88 in the direction of tension and width and in the running direction of the magnetic tape 88 for allowing the magnetic tape 88 to run in stable condition. At this time, an air film layer is produced between the tape slide surfaces 82a, 82a of the tape guide members 102A, 102B and the running magnetic tape 88, thus preventing friction from being produced.

With the recording/reproducing apparatus 90, the magnetic tape 88 is positively contacted with the gap material g of the magnetic head 81 under a condition in which the tape tension of the running magnetic tape 88 is kept constant by the tape guide members 82A, 82B, so that data signals are reliably recorded or read out on the magnetic tape 88 by the gap material g.

With the above-described fourth embodiment of the recording/reproducing apparatus 110, the tape guide members 82A, 82B formed with tape suction recesses 82b, 82b are provided between the magnetic head 81 and the tape guide pins 111A, 111B for sucking the running magnetic tape 88 by the suction recesses 82a, 82a for controlling the vibrations in the direction of tension and width and in the running direction of the magnetic tape 88. The result is that the running performance of the magnetic tape 88 may be improved for stabilizing the recording/reproducing characteristics of the magnetic tape 88 for reliably prohibiting data errors from occurrence.

Also, with the recording/reproducing apparatus 110, since the tape guide members 82A, 82B are arranged so that the suction grooves 82b, 82b are positively closed by the magnetic tape 88 when the magnetic head 81 is thrust against the magnetic tape 88, the magnetic tape 88 can be run in stable condition for a broad range of thrusting degree of the magnetic head 81 against the magnetic head 81, while the magnetic tape 88 may be improved in running performance.

Thus it is possible for the recording/reproducing apparatus 110 to run the magnetic tape 88 in stable condition and to use a higher recording frequency for the magnetic tape 88 for increasing the number of recording tracks and hence the recording capacity of the magnetic tape 88.

In the fourth embodiment of the recording/reproducing apparatus 110, the tape guide members 82A, 82B may be formed integrally with both side portions of the magnetic head 81.

Although the tape guide members 82A, 82B are arranged between the magnetic head 81 and the tape guide pins 111A, 111B in the fourth embodiment of the recording/reproducing apparatus 110, the sole tape guide member 82A may be provided between the magnetic head 81 and one 111A of the tape guide pins.

Figure 58:
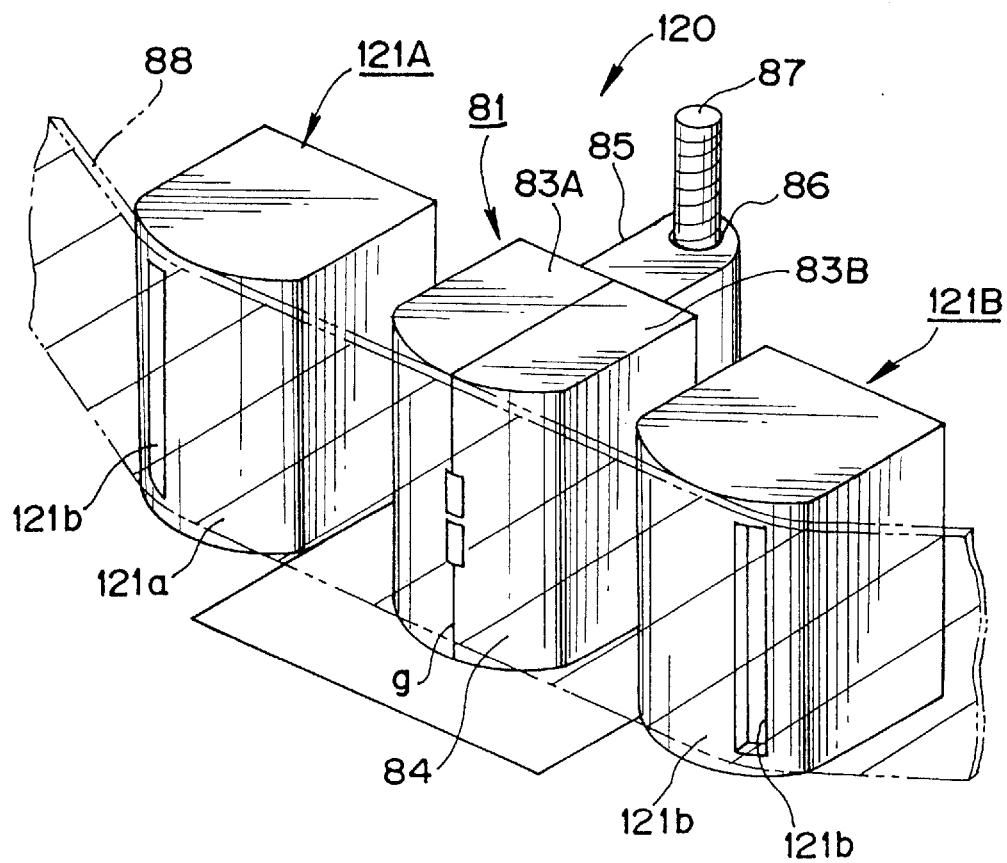
FIG. 58 is a schematic view showing a recording/ reproducing apparatus according to a fifth embodiment of the present invention.
Figure 65:
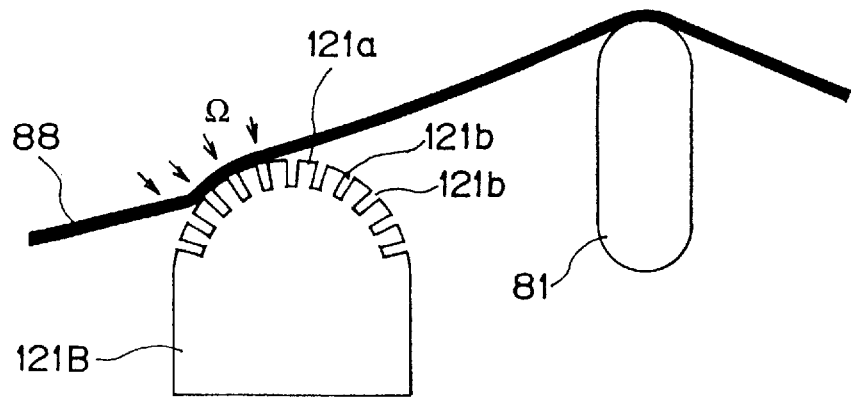
FIG. 65 is a schematic view for illustrating the state of contact of the tape guide member of the recording/ reproducing apparatus of FIG. 64 with the magnetic tape.

A recording/reproducing apparatus 120 according to a fifth embodiment has a basic structure similar to that of the recording/reproducing apparatus 80 of the first embodiment, as shown in FIGS. 58 and 65. In the following description, the parts or components similar to those of the recording/reproducing apparatus 80 of the above-described first embodiment are denoted by the same reference numerals and the detailed description is not made for clarity.

The fifth embodiment of the recording/reproducing apparatus 120 has tape guide members 121A, 121B, having tape sliding curved surfaces 121a, 121a curved in the running direction of the magnetic tape 88, as shown in FIG. 58.

Figure 59:
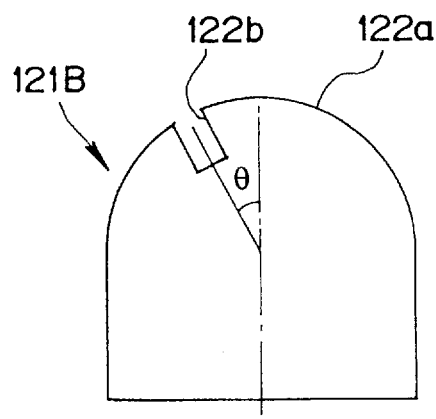
FIG. 59 is a horizontal cross-sectional view showing a tape guide member of the recording/reproducing apparatus shown in FIG. 58.

The tape sliding curved surfaces 121a, 121a are formed with tape suction groves 121b, 121b on the opposite side with respect to the magnetic head 81, as shown in FIG. 59. These tape suction grooves 121b, 121b are each formed within a range of 0° to 90° with the distal end of the curved surface as a reference point. These tape suction grooves 121b, 121b are formed as rectangular recessed grooves extending along the width of the magnetic tape 88. Also, these tape suction grooves 121b, 121b are of a height smaller than the width of the magnetic tape 88 and a width smaller than the length of the magnetic tape 88 contacted with the curved surfaces 121a, 121a.

Figure 60:
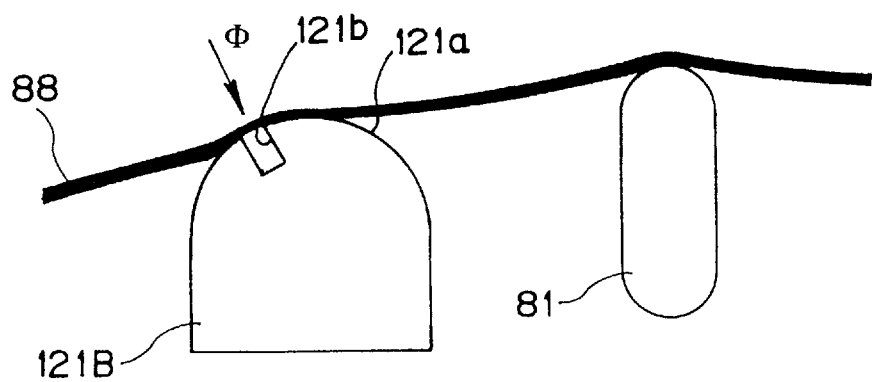
FIG. 60 is a schematic view for illustrating the state of a magnetic tape running along the tape guide member in the recording/reproducing apparatus shown in FIG. 58.
Figure 61:
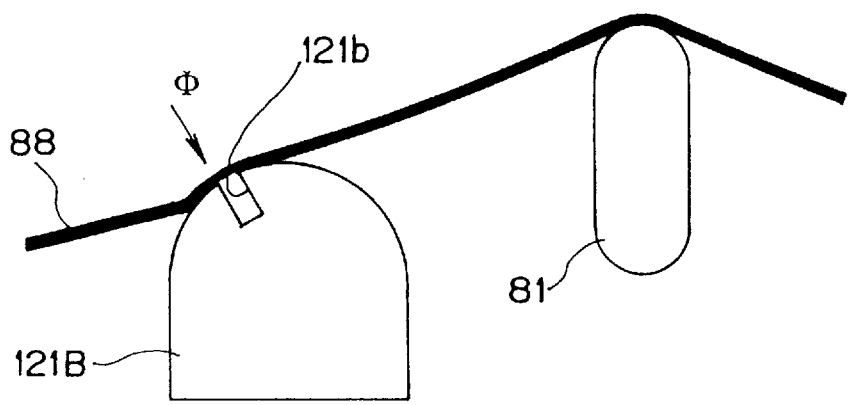
FIG. 61 is a schematic view for illustrating the state of contact of the tape guide member of the recording/ reproducing apparatus of FIG. 58 with the magnetic tape.
Figure 62:
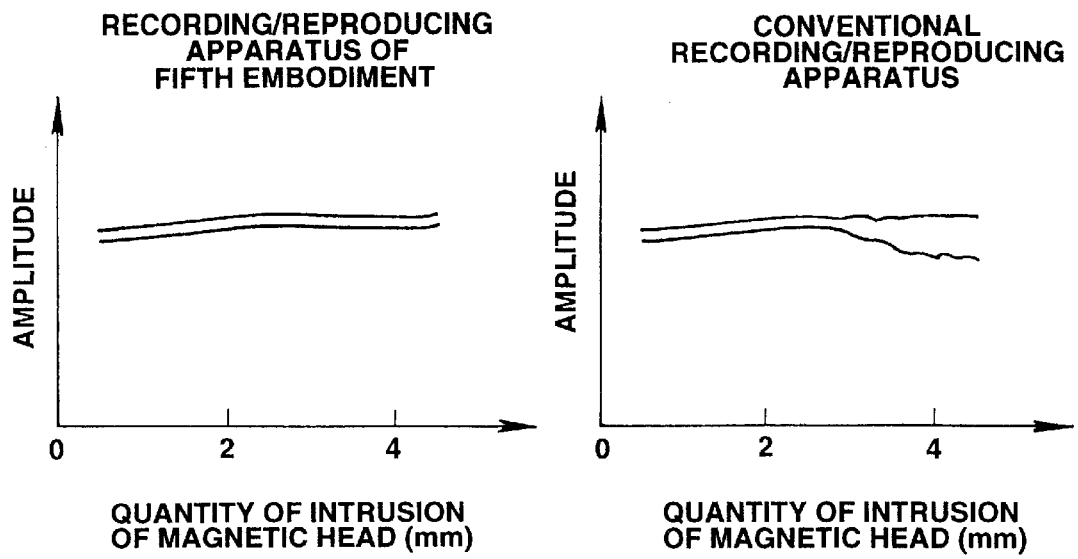
FIG. 62 is a graph for comparative illustration of the amplitude of the magnetic tape in the recording/reproducing apparatus of FIG. 58.

When the magnetic tape 88 is run with a slight contact with the tape guide members 121A, 121B, there is produced a difference in atmospheric pressure across the magnetic tape 88 due to the tape suction recesses 121b, 121b in the tape guide members 121A, 121B, thus the tape being sucked in a direction indicated by arrow φ in FIG. 60. If the magnetic head 81 is thrust further against the magnetic tape 88, the tape suction grooves 121b, 121b in the tape guide members 121A, 121B continue to be closed by the magnetic tape 88, as shown in FIG. 61.

Thus, by the force of suction exerted by the tape suction recesses 121b, 121b in the tape guide members 121A, 121B on the magnetic tape 88, the recording/reproducing apparatus 120 damps the vibrations of the magnetic tape 88 in the direction of tension and width and in the running direction of the magnetic tape 88 for allowing the magnetic tape 88 to run in stable condition. At this time, an air film layer is produced between the tape slide curved surfaces 121a, 121a of the tape guide members 121A, 121B and the running magnetic tape 88, thus preventing friction from being produced.

It has been shown experimentally that, with the recording/reproducing apparatus 120, the magnetic tape 88 can be run with damped vibrations of the magnetic tape 88, even if the thrusting degree (thrusting amount) of the magnetic head against the magnetic tape 88 is increased.

These experimental results are obtained by comparing he amplitude of the magnetic tape 88 with the fifth embodiment of the recording/reproducing apparatus 120 to that with the conventional recording/reproducing apparatus. With the fifth embodiment of the recording/reproducing apparatus 120, it may be confirmed that, if the amount of thrust a of the magnetic head 81 against the magnetic tape 88 is n a range of from 3.0 to 5.0 mm, the amplitude of the magnetic tape 88 can be decreased to a value significantly smaller than the value for the conventional recording/reproducing apparatus.

It has also been experimentally shown that, with the recording/reproducing apparatus 120, the contact area of the magnetic tape 88 with the magnetic head 81 may be maintained at a larger stable value even under an adverse condition of a smaller amount of thrusting α of the magnetic head 81 against the magnetic tape 88.

Figure 63:
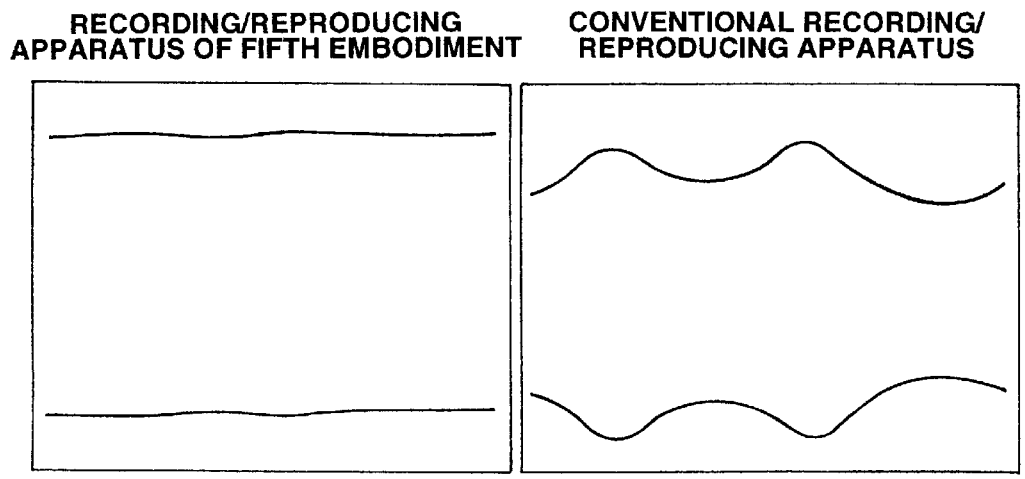
FIG. 63 is a graph for illustrating comparison of the contact area of the magnetic tape with respect to the magnetic head in the recording/reproducing apparatus of FIG. 58.
Figure 64:
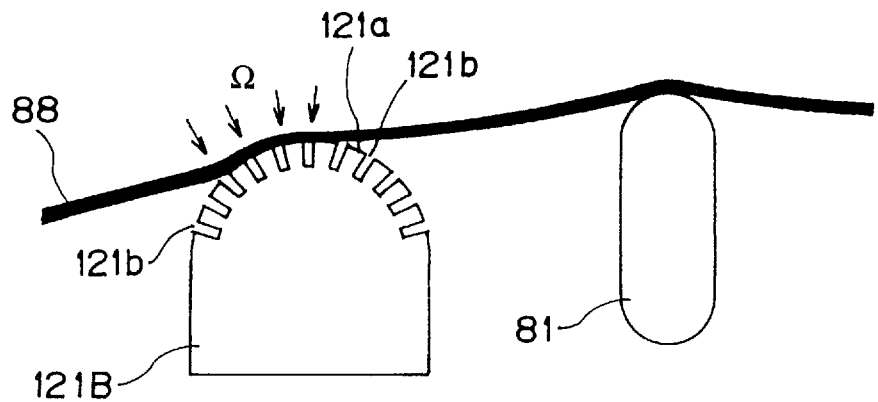
FIG. 64 is a schematic view showing a modification of the recording/reproducing apparatus of FIG. 58.

These experimental results are obtained from a graph of FIG. 63 showing the contact areas in the tension direction of the magnetic tape 88 with the magnetic head 81 in the present third embodiment of the recording/reproducing apparatus 120 and the conventional recording/reproducing apparatus. It is seen from Fig. that, with the present fifth embodiment of the recording/reproducing apparatus 100, the contact area of the magnetic tape 88 with the magnetic head 81 may be larger and more stable than that in the conventional recording/reproducing apparatus if the amount of thrusting α of the magnetic head 81 against the magnetic tape 88 is 2.0 mm.

Consequently, with the fifth embodiment of the recording/reproducing apparatus 120, the magnetic head 81 can be positively contacted with the magnetic tape 81, even if the amount of thrust α of the magnetic head 81 against the magnetic tape 88 is in a broad range from 0.0 to 5.0 mm, for controlling the vibrations of the magnetic tape 88.

The recording/reproducing apparatus 120 causes the magnetic tape 88 to be reliably contacted with the gap material g of the magnetic head 81, while the tape tension of the running magnetic tape 88 is kept constant by the tape guide members 121A, 121B. In this state, data signals are recorded or read out on the magnetic tape 88 by the gap material g.

With the above-described fifth embodiment of the recording/reproducing apparatus 120, since the tape guide members 121A, 121B formed with the tape suction grooves 121b, 121b are formed on both lateral sides of the magnetic head 81, the running magnetic tape 88 is sucked by the tape suction grooves 121b, 121 for controlling the vibrations of the magnetic tape 88 in the direction of tension and width and in the running direction of the magnetic tape 88 for improving running performance and stabilizing recording/reproducing characteristics of the magnetic tape 88 and for positively preventing data errors from occurrence.

In addition, with the recording/reproducing apparatus 120, since the tape guide members 121A, 121B are arranged so that, with the magnetic head 81 being thrust against the magnetic tape 88, the magnetic tape suction grooves 121b, 121b are positively closed by the magnetic tape 88, the magnetic tape 88 can be run in stability over a broad range of the thrusting amount of the magnetic head 81 against the magnetic tape 88, thus further improving the running performance of the magnetic tape 88.

Moreover, with the recording/reproducing apparatus 120, since the magnetic tape guide members 121A, 121B are provided at a distance from the magnetic head 81, the recording/reproducing characteristics may be stabilized for all recording tracks of the magnetic tape 88 without regard to the position of the magnetic head 81 with respect to the magnetic tape 88 for positively preventing data errors from occurrence.

Thus it is possible for the recording/reproducing apparatus 120 to run the magnetic tape 88 in stable condition and to use a higher recording frequency for the magnetic tape 88 for increasing the number of recording tracks and hence the recording capacity of the magnetic tape 88.

In the fifth embodiment of the recording/reproducing apparatus 120, the tape suction grooves 121b, 121b are formed only in the tape sliding curved surfaces 121a, 121a of the tape guide members 121A, 121B. However, a large number of tape suction grooves 121b, 121b may be formed in the tape slide curved surfaces 121a, 121a. If the magnetic tape 88 runs in slight contact with the tape suction grooves 121b, 121b, there is produced a difference in atmospheric pressure across the magnetic tape 88 for sucking the tape in a direction indicated by arrow Ω in FIG. 64. If the magnetic head 81 is thrust further towards the magnetic tape 88, the numerous tape suction grooves 121b, 121b are kept closed against the magnetic tape 88, as shown in FIG. 65.

In the fifth embodiment of the recording/reproducing apparatus 120, the tape guide members 121A, 121B are provided on both sides of the magnetic head 81. However, the sole tape guide member 82A may be provided on one side of the magnetic head 81.

The present invention may be applied to a magnetic head used for a tape cartridge for recording/reproduction, such as a tape cartridge for housing magnetic tapes of variable tape widths, such as 4 mm, 8 mm, ¼ mm, ½' or 1' width, tape cartridges for audio or tape cartridges for video tape recorders.

We claim:

1. A tape cartridge comprising:

a main cartridge portion;

a pair of tape reels rotatably arranged in the inside of said main cartridge portion;

a magnetic tape placed around said tape reels; and magnetic tape guides located on a lateral surface of a cut-out formed in the main cartridge portion into which is intruded a magnetic head from a recording/reproducing apparatus, each tape guide having a tape slide surface with one magnetic tape suction recess therein, said magnetic tape suction recess having only one magnetic tape suction opening, said magnetic tape suction opening being located in said tape sliding surface, the perimeter of which is covered by said magnetic tape, each of said magnetic tape guides having an inclined portion inclined towards the magnetic tape and declining nearing said cut-out, said magnetic tape suction opening applying suction force on the magnetic tape running on the tape slide surface of said tape guide means.

2. A tape cartridge comprising:

a main cartridge portion;

a pair of tape reels rotatably arranged in the inside of said main cartridge portion;

a magnetic tape placed around said tape reels; and at least one magnetic tape guide having a surface over which said magnetic tape passes, with one magnetic tape suction recess therein, said magnetic tape suction recess having only one magnetic tape suction opening, said magnetic tape suction opening being located in said tape sliding surface, the perimeter of which is covered by said magnetic tape, wherein the magnetic tape suction opening applies a suction force on the magnetic tape and has a height substantially the same as a width of said magnetic tape.

3. The tape cartridge as claimed in claim 2 wherein the tape guide means has an inclined portion, and is located on a lateral surface of a cut-out formed in the main cartridge portion into which is intruded a magnetic head from a recording/reproducing apparatus, said inclined portion being inclined towards the magnetic tape with an inclination decreasing nearing said cut-out.

4. The tape cartridge as claimed in claim 1 or 2 wherein the tape guide means causes displacement of the magnetic tape in a range from −0.1 mm to 5.0 mm.

5. The tape cartridge as claimed in claim 1 or 2 wherein the magnetic tape is thrust by a magnetic head from a recording/reproducing apparatus between 0.0 mm and 5.0 mm.

* * * * *